United States Patent
Yaginuma et al.

(10) Patent No.: US 11,411,275 B2
(45) Date of Patent: Aug. 9, 2022

(54) SPRING MEMBER, FUEL CELL UNIT, FUEL CELL STACK, AND METHOD FOR MANUFACTURING FUEL CELL STACK

(71) Applicant: Nissan Motor Co., Ltd., Yokohama (JP)

(72) Inventors: Motoki Yaginuma, Kanagawa (JP); Norihiro Tajima, Kanagawa (JP); Koichi Kawasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 127 days.

(21) Appl. No.: 16/642,419

(22) PCT Filed: Aug. 28, 2018

(86) PCT No.: PCT/JP2018/031819
§ 371 (c)(1),
(2) Date: Feb. 27, 2020

(87) PCT Pub. No.: WO2019/058902
PCT Pub. Date: Mar. 28, 2019

(65) Prior Publication Data
US 2020/0259134 A1    Aug. 13, 2020

(30) Foreign Application Priority Data
Sep. 22, 2017  (JP) .............................. JP2017-182981

(51) Int. Cl.
*H01M 50/20* (2021.01)
*H01M 8/2404* (2016.01)
*H01M 8/00* (2016.01)
*H01M 8/02* (2016.01)

(52) U.S. Cl.
CPC ............ *H01M 50/20* (2021.01); *H01M 8/006* (2013.01); *H01M 8/02* (2013.01); *H01M 8/2404* (2016.02)

(58) Field of Classification Search
None
See application file for complete search history.

(56) References Cited

U.S. PATENT DOCUMENTS

| 4,345,234 A | * | 8/1982 | Reich | ................... | H01H 37/006 236/101 R |
| 2005/0277012 A1 | * | 12/2005 | Inagaki | ................. | H01M 8/247 429/511 |
| 2017/0294673 A1 | * | 10/2017 | Morikawa | ............... | H01M 8/12 |

FOREIGN PATENT DOCUMENTS

| EP | 2 330 673 A2 | 6/2011 |
| JP | 2013-97982 A | 5/2013 |

\* cited by examiner

*Primary Examiner* — Haroon S. Sheikh
(74) *Attorney, Agent, or Firm* — Global IP Counselors, LLP

(57) ABSTRACT

A grid spring is provided with first raised pieces that generate an elastic force for pressing a separator toward a power generation cell and second raised pieces that generate an elastic force independently of the first raised pieces. The spring constant of the first raised pieces decreases as a result of heating of a grid spring. The grid spring functions as a high reaction force spring as a result of a larger spring constant of the first spring member relative to a spring constant of the second spring member before heating. After being heated, the grid spring functions as a low reaction force spring as a result of the smaller spring constant of the first spring member before being heated.

19 Claims, 32 Drawing Sheets

SPRING MEMBER, FUEL CELL UNIT, FUEL CELL STACK, AND METHOD FOR MANUFACTURING FUEL CELL STACK

CROSS-REFERENCE TO RELATED APPLICATIONS

This application is a U.S. national stage application of International Application No. PCT/JP2018/031819, filed on Aug. 28, 2018, which claims priority to Japanese Patent Application No. 2017-182981, filed on Sep. 22, 2017. The entire contents disclosed in Japanese Patent Application No. 2017-182981 is hereby fully incorporated herein by reference.

BACKGROUND

Technical Field

The present invention relates to a spring member used in a fuel cell stack, a fuel cell unit, a fuel cell stack, and a method for manufacturing a fuel cell stack.

Background Information

Conventionally, a fuel cell stack is made by stacking a plurality of fuel cell units, each having a power generation cell that is formed by sandwiching an electrolyte from both sides with a pair of electrodes and that generates power using supplied gas, and a separator that defines a flow path portion, i.e., a flow passage for the gas between the separator and the power generation cell (for example, refer to Japanese Laid-Open Patent Application No. 2013-97982-Patent Document 1).

The fuel cell stack has a spring member that generates elastic force that presses the separator toward the power generation cell.

SUMMARY

When the fuel cell units are stacked, it is necessary to support the components to be assembled with a spring member and to assembly the components in close contact with each other; thus, the spring member is required to have a high spring constant.

However, during operation of the fuel cell stack, the temperature of the spring member becomes high due to the heat that is generated from the power generation cell, etc. The higher the spring constant, the more readily the spring member undergoes creep deformation when the temperature of the spring member becomes high. Therefore, if a spring member with a high spring constant is used when the cell units are stacked, the spring member could undergo creep deformation and it may become impossible to ensure sufficient surface pressure between the power generation cell and the separator during operation of the fuel cell stack. As a result, there is the problem of reduced collector resistance between the power generation cell and the separator, and thus decreased power generation performance of the fuel cell.

An object of the present invention is to provide a spring member, a fuel cell unit, a fuel cell stack, and a method for manufacturing a fuel cell stack that can prevent the decrease in the power generation performance caused by the creep deformation of the spring member.

In order to achieve the object described above, the spring member according to the present invention is used in a fuel cell stack, comprising a first spring member that generates elastic force for pressing a separator toward a power generation cell, and a second spring member that generates elastic force independently of the first spring member. The spring constant of the first spring member decreases with applied heat. Since the spring constant of the first spring member is larger than the spring constant of the second spring member before the first spring member is heated, the spring member functions as a high reaction force spring, and, once heated, the spring member functions as a low reaction force spring as a result of the smaller spring constant of first spring member as compared prior to being heated.

In order to achieve the object described above, in the method for manufacturing the fuel cell stack, when the fuel cell units are stacked, a spring member including a first spring member that generates elastic force for pressing the separator toward the power generation cell, and a second spring member that generates the elastic force independently of the first spring member, is disposed. When the spring member described above is disposed, the spring member that functions as a high reaction force spring as a result of the larger spring constant of the first spring member relative to the spring constant of the second spring member. In said manufacturing method, the fuel cell units are stacked after which the spring member is heated, to thereby decrease the spring constant of the first spring member and cause the spring member to function as a low reaction force spring.

DETAILED DESCRIPTION OF THE EMBODIMENTS

Figure 1:
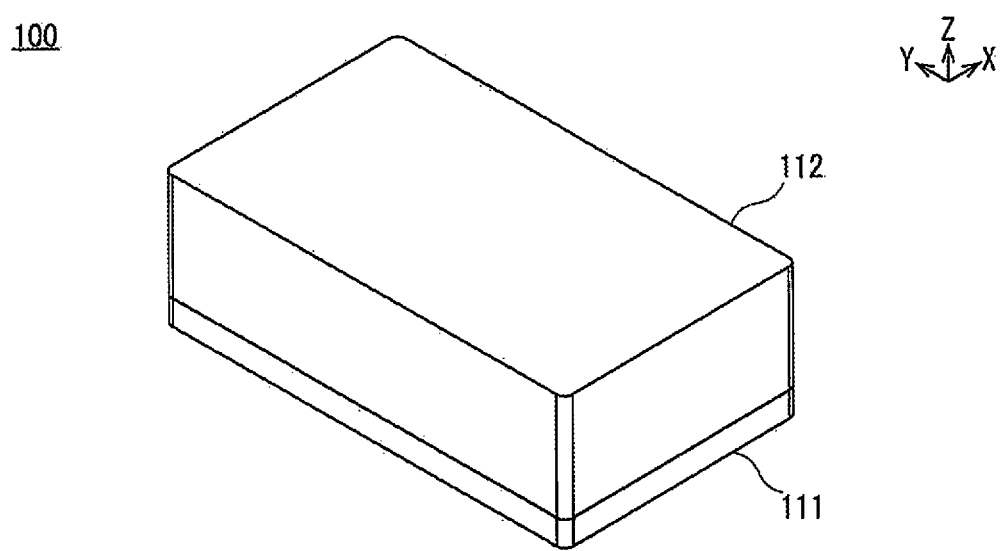
FIG. 1 is a perspective view illustrating a fuel cell stack according to a first embodiment.

Embodiments of the present invention will be explained below, with reference to the appended drawings. In the drawings, the same members have been assigned the same reference symbols and redundant explanations have been omitted. In the drawings, the sizes and proportions of the members have been exaggerated for ease of understanding the embodiment, and may differ from the actual sizes and proportions.

The orientations of members constituting a fuel cell stack are shown using arrows indicated by X, Y, and Z in each of the drawings. The direction of the arrow indicated by X is the transverse direction X of the fuel cell stack. The direction of the arrow indicated by Y is the longitudinal direction Y of the fuel cell stack. The direction of the arrow indicated by Z is the stacking (height) direction Z of the fuel cell stack.

Configuration of Fuel Cell 100

Figure 2:
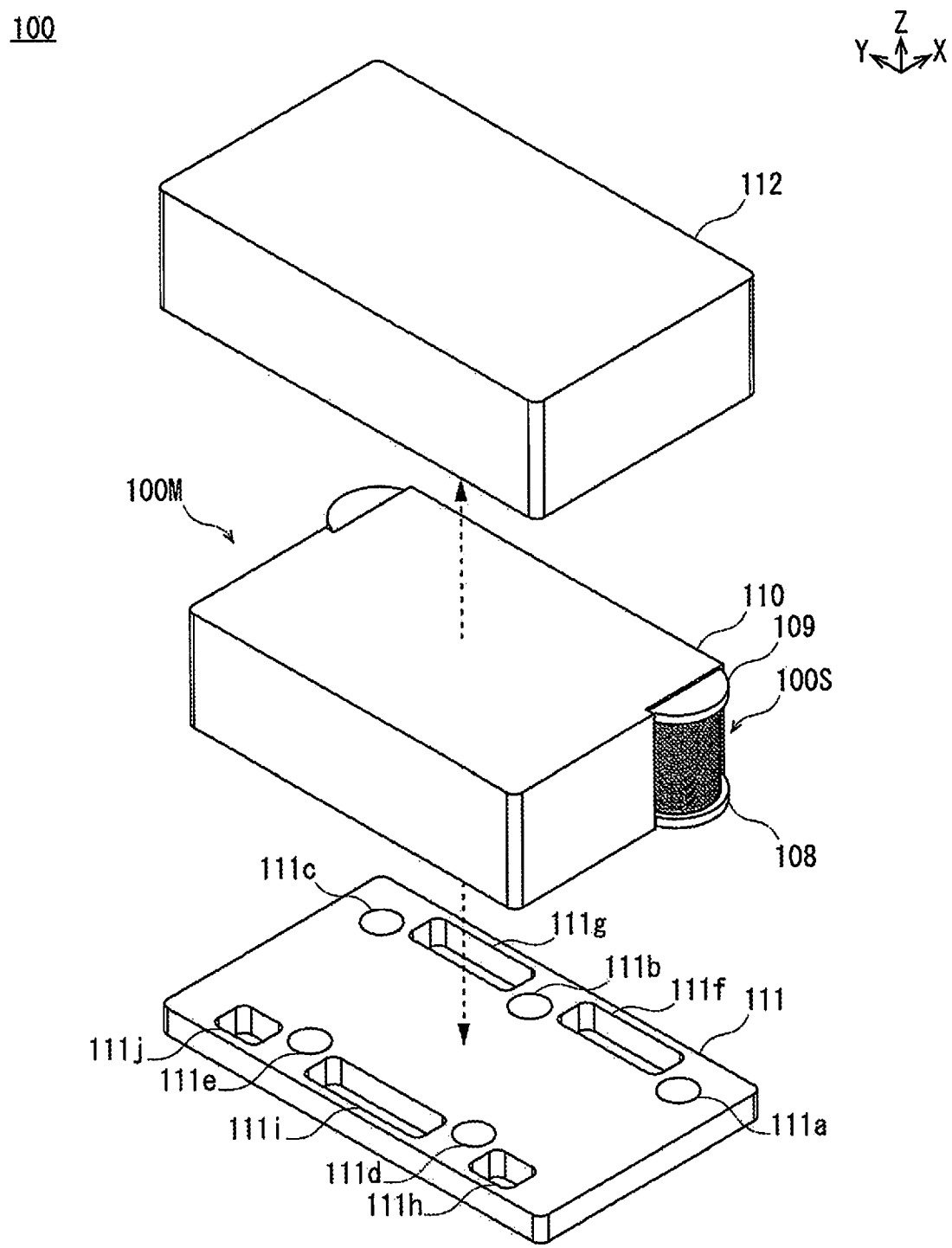
FIG. 2 is a perspective view illustrating a state in which the fuel cell stack of FIG. 1 is disassembled to show a cover, a cell stack assembly, and an external manifold.

As shown in FIGS. 1 and 2, the fuel cell 100 is formed by sandwiching a cell stack assembly 100M from above and below with a cover 112 that protects the cell stack assembly 100M and an external manifold 111 that supplies gas from the outside.

Figure 3:
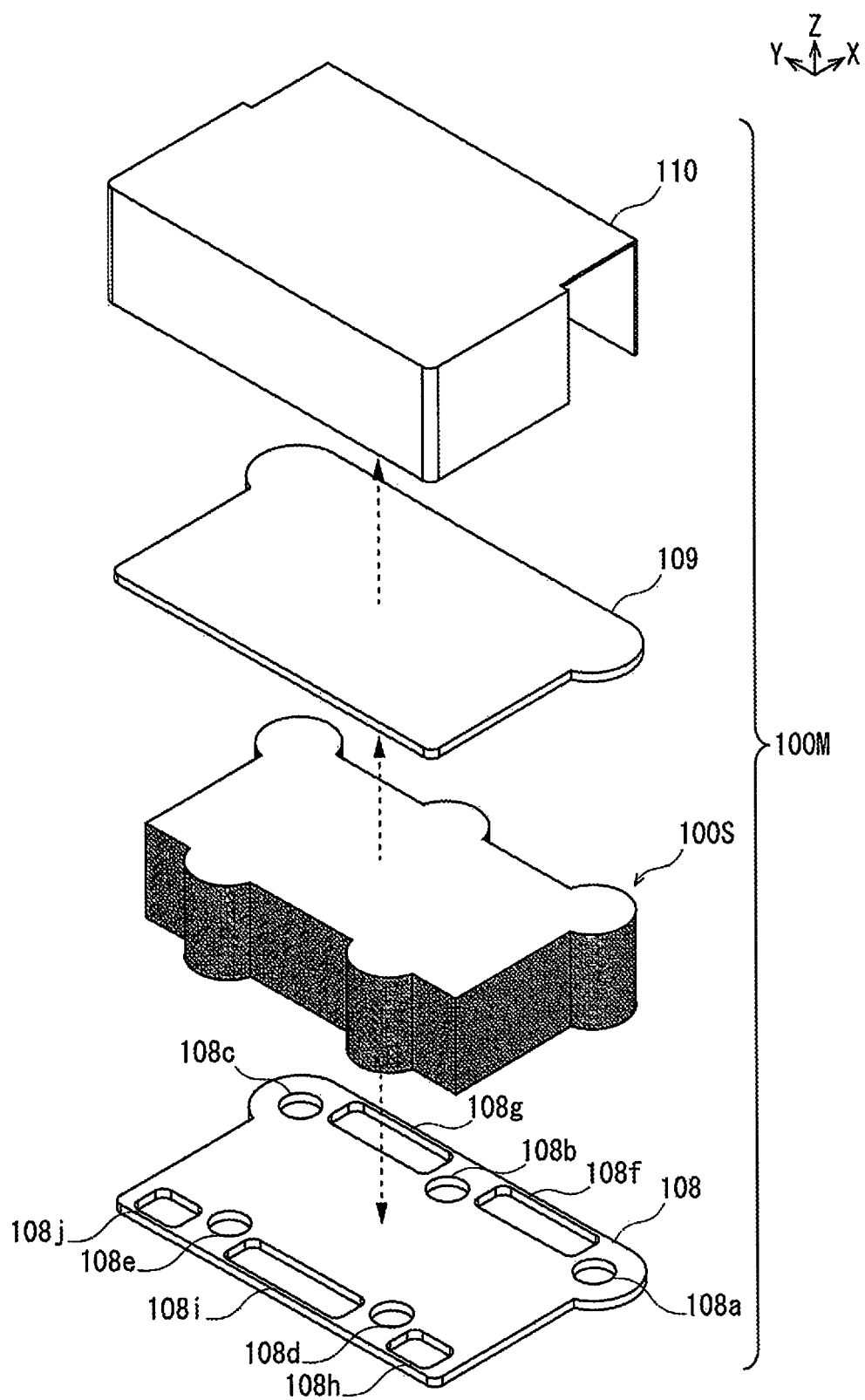
FIG. 3 is a perspective view illustrating a state in which the cell stack assembly of FIG. 2 is disassembled to show an air shelter, an upper end plate, a stack, and a lower end plate.

As shown in FIGS. 2 and 3, the cell stack assembly 100M is formed by sandwiching a fuel cell stack 100S from above and below with an upper end plate 109 and a lower end plate 108, which are then covered with an air shelter 110 that seals cathode gas CG.

Figure 4:
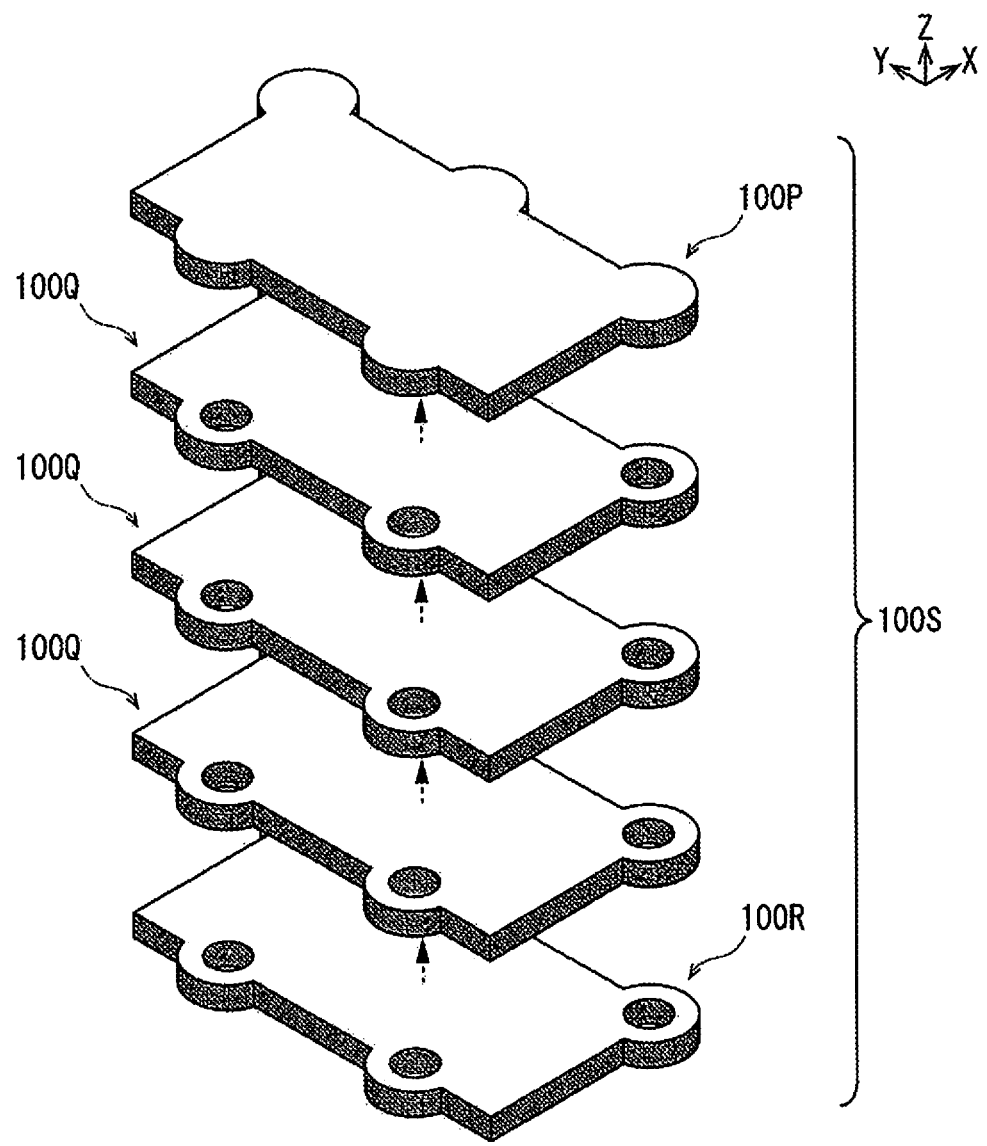
FIG. 4 is a perspective view illustrating a state in which the stack of FIG. 3 is disassembled to show an upper module unit, a plurality of middle module units, and a lower module unit.

As shown in FIGS. 3 and 4, the fuel cell stack 100S is formed by stacking an upper module unit 100P, a plurality of middle module units 100Q, and a lower module unit 100R.

Figure 5:
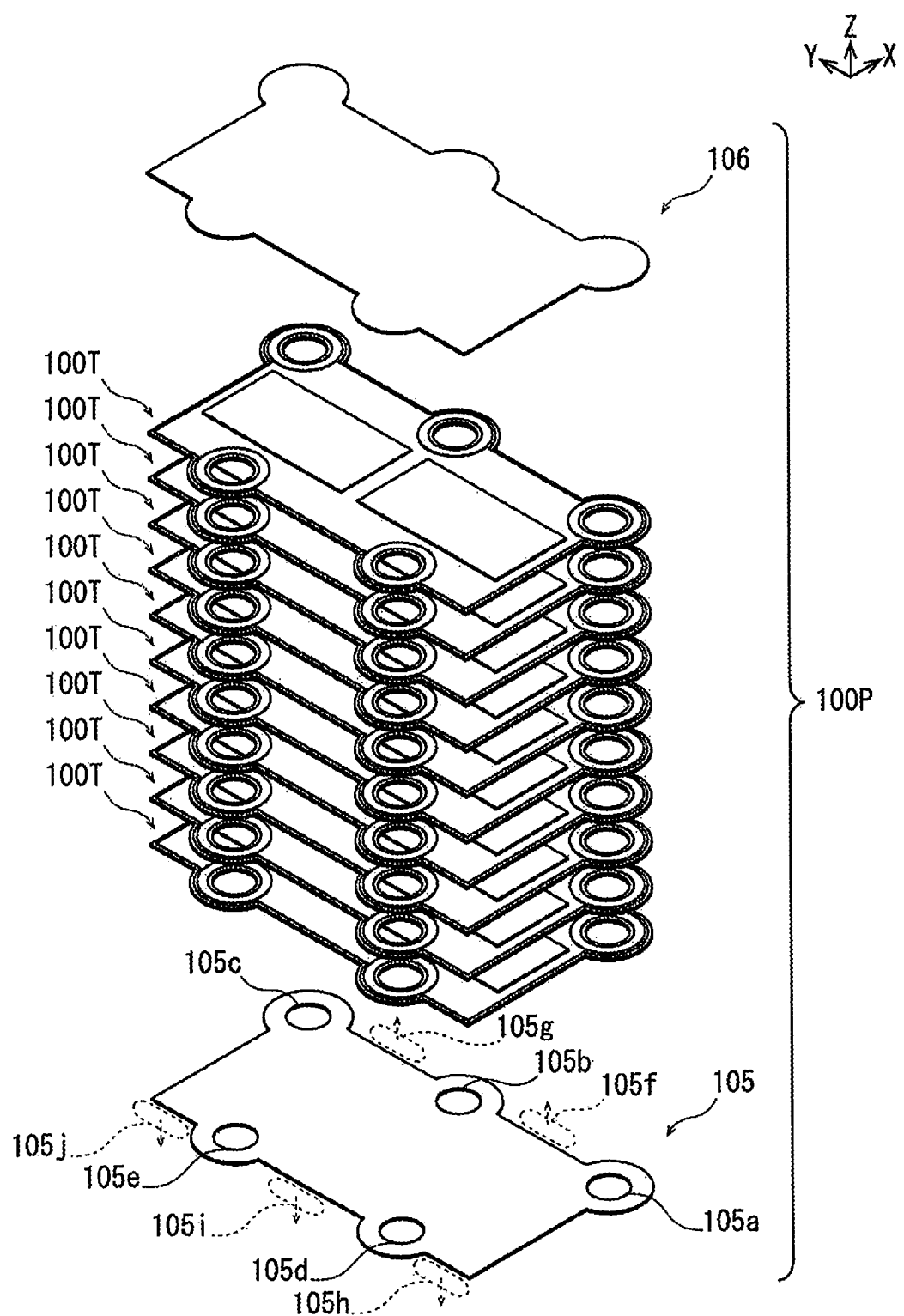
FIG. 5 is an exploded perspective view illustrating the upper module unit of FIG. 4.

As shown in FIG. 5, the upper module unit 100P is formed by sandwiching a plurality of stacked cell units 100T (corresponding to a fuel cell unit) from above and below with an upper collector plate 106 that outputs electric power generated by the cell units 100T to the outside, and a module end 105, which corresponds to an end plate.

Figure 6:
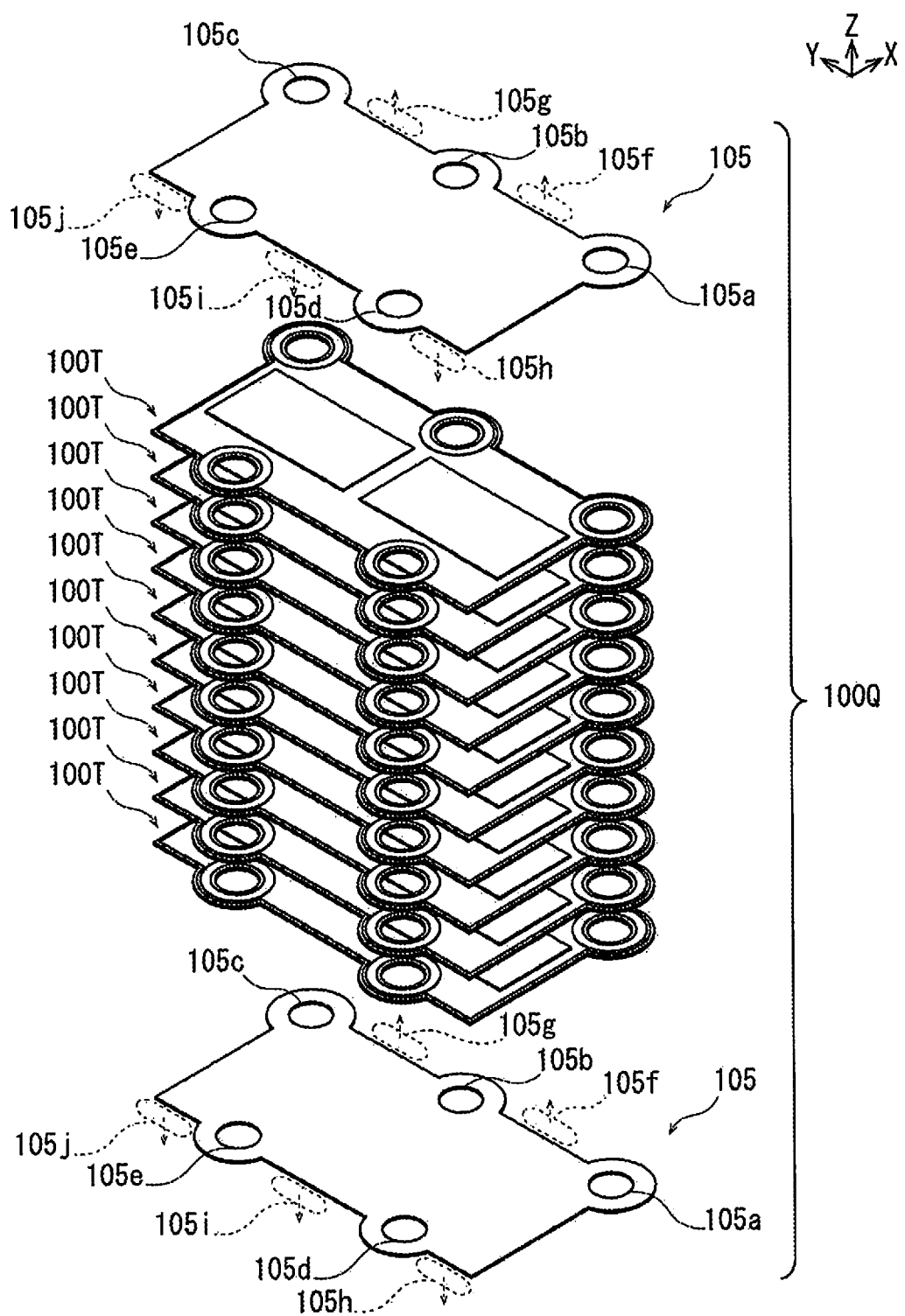
FIG. 6 is an exploded perspective view illustrating the middle module unit of FIG. 4.

As shown in FIG. 6, the middle module unit 100Q is formed by sandwiching a plurality of stacked cell units 100T from above and below with a pair of module ends 105.

Figure 7:
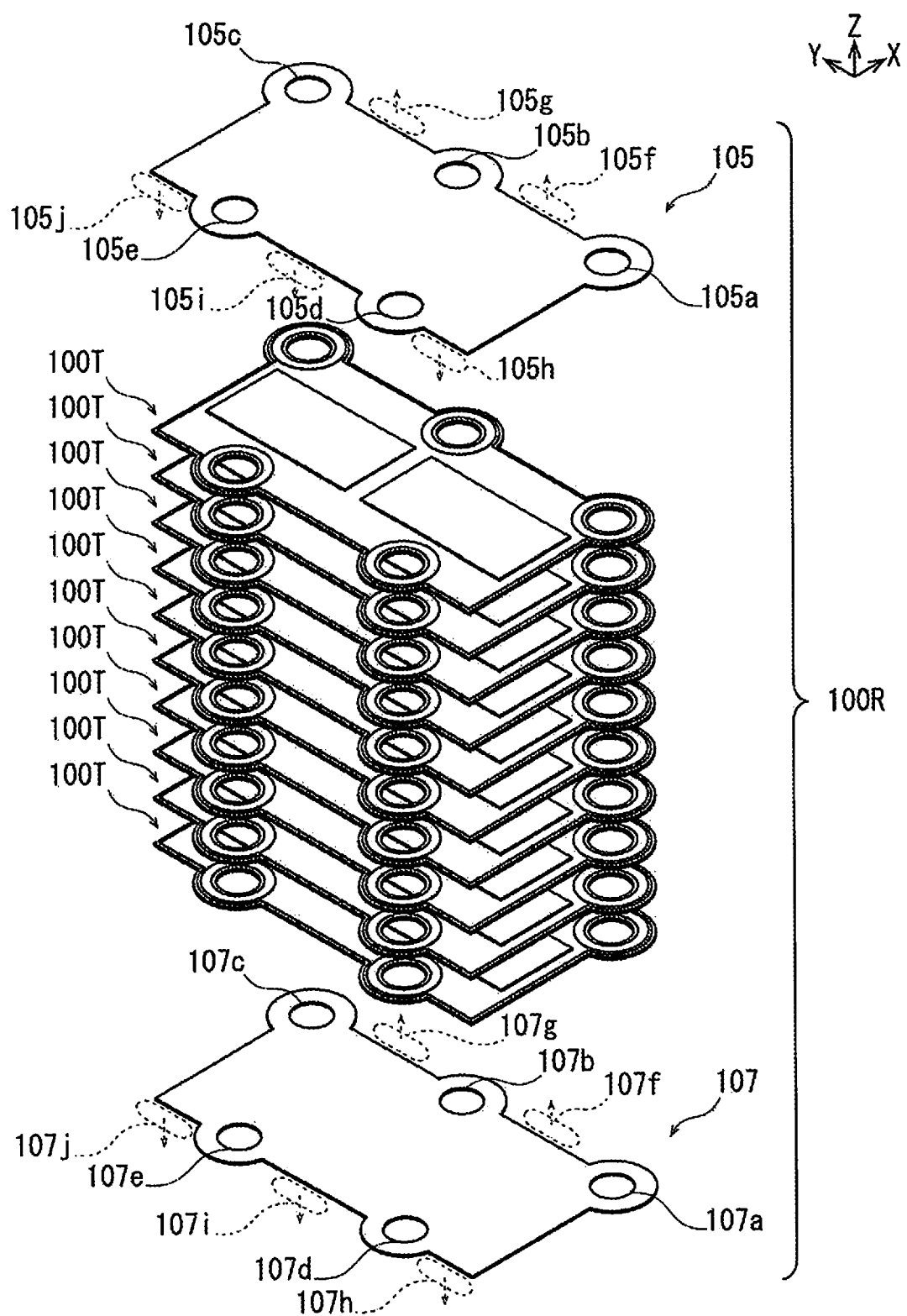
FIG. 7 is an exploded perspective view illustrating the lower module unit of FIG. 4.

As shown in FIG. 7, the lower module unit 100R is formed by sandwiching a plurality of stacked cell units 100T from above and below with the module end 105 and a lower collector plate 107.

Figure 8:
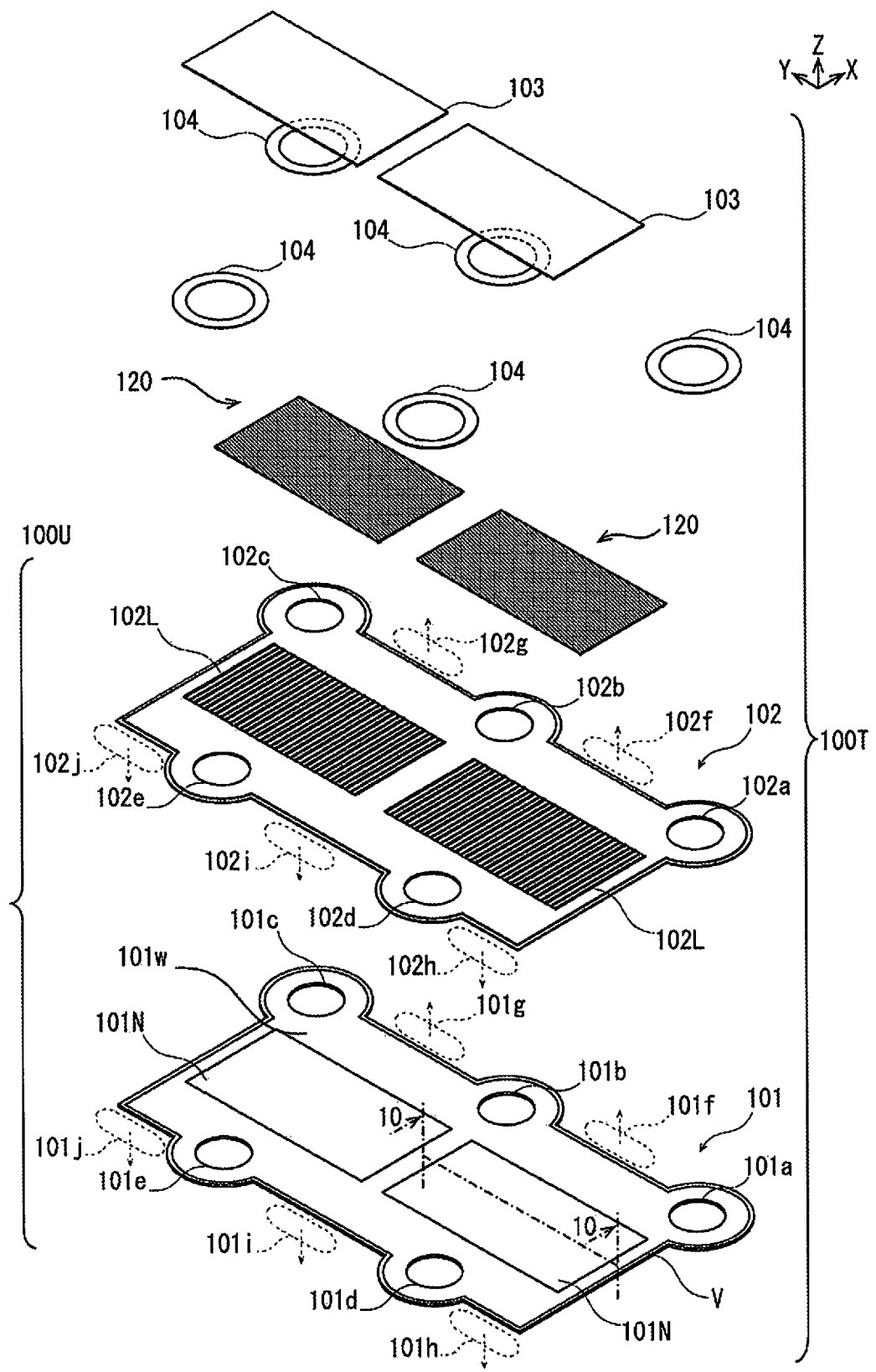
FIG. 8 is an exploded perspective view illustrating the unit of FIGS. 5 to 7.

As shown in FIG. 8, the cell unit 100T includes a metal support cell assembly 101 provided with power generation cells 101M that generate power using supplied gas, a separator 102 that separates adjacent power generation cells 101M, sealing members 104 that partially seal the gap between the metal support cell assembly 101 and the separator 102 and restricts the flow of the gas, and grid springs 120 that are in conductive contact with one of the power generation cells 101M and that generates an elastic force that presses the separator 102 toward another of the power generation cells 101M that is adjacent to the one power generation cell 101M.

As shown in FIG. 8, a joined body 100U includes the metal support cell assembly 101 and the separator 102. In the joined body 100U, the metal support cell assembly 101 and the separator 102 are configured such that the outer edges thereof are annularly joined along a joining line V, as shown in FIG. 8. The cell unit 100T is formed by disposing the sealing members 104 between the joined body 100U and the joined body 100U that are vertically adjacent to each other.

The fuel cell stack 100S will be described below for each configuration.

Figure 9:
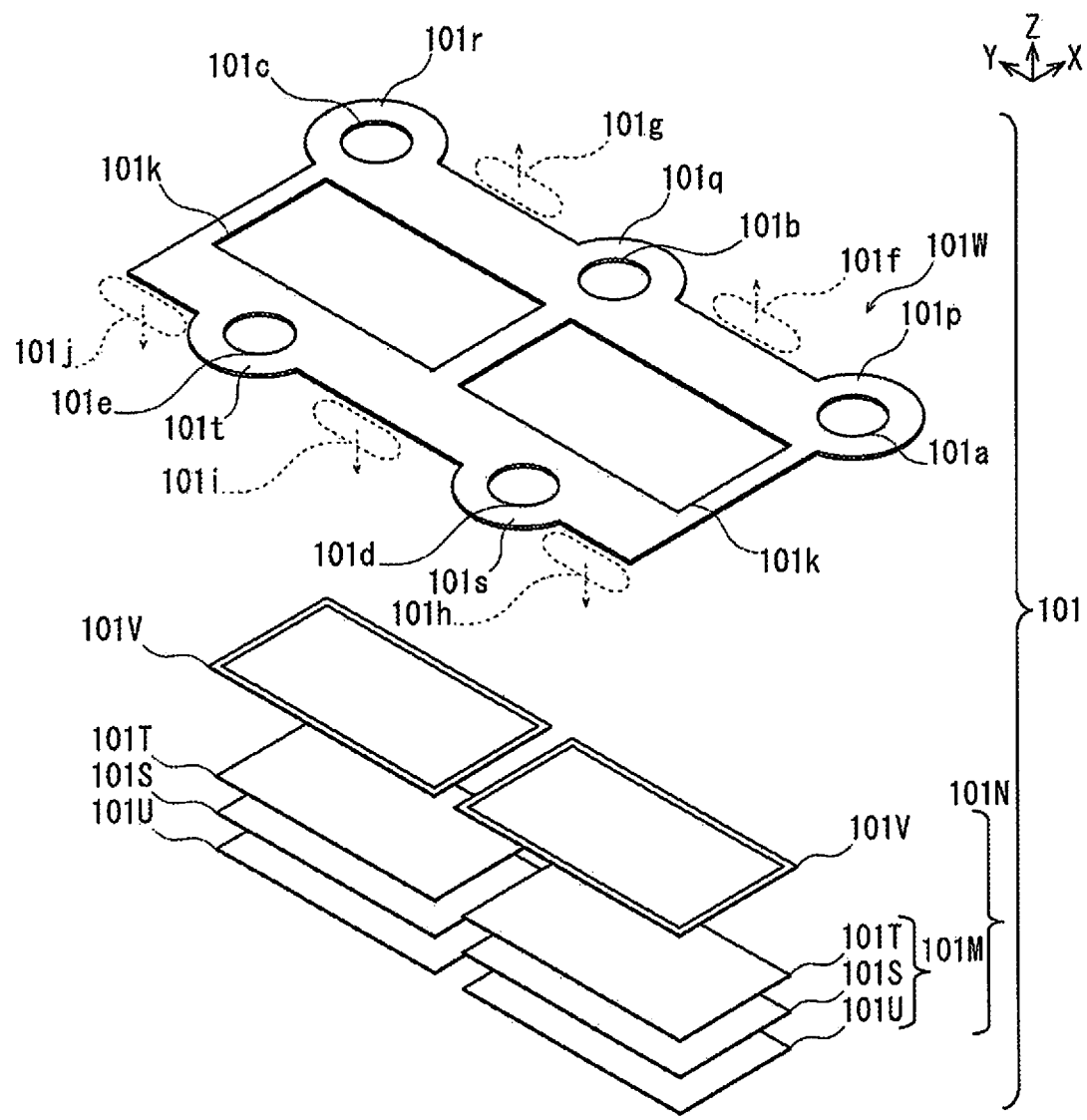
FIG. 9 is an exploded perspective view illustrating the metal support cell assembly of FIG. 8.
Figure 10:
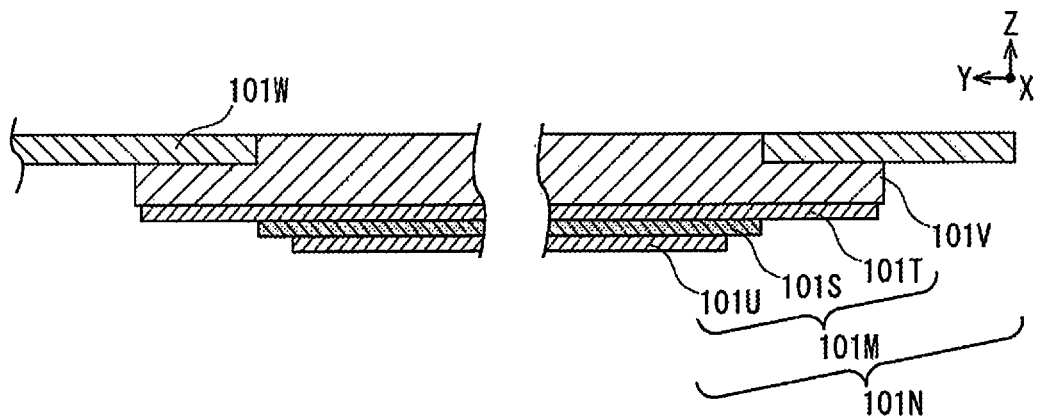
FIG. 10 is a cross-sectional view of the metal support cell assembly along line 10-10 in FIG. 8.

As shown in FIGS. 8-10, the metal support cell assembly 101 is provided with power generation cells 101M that generate power using supplied gas.

In the metal support cell assembly 101, the power generation cell 101M is formed by sandwiching an electrolyte 101S between a fuel electrode-side electrode (anode 101T) and an oxidant electrode-side electrode (cathode 101U) as shown in FIGS. 9 and 10. A metal support cell 101N is configured from the power generation cell 101M and a support metal 101V that supports the power generation cell 101M from one side. The metal support cell assembly 101 is configured from a pair of metal support cells 101N and a cell frame 101W that holds the pair of metal support cells 101N from the periphery.

As shown in FIGS. 9 and 10, the electrolyte 101S allows oxide ions to pass from the cathode 101U to the anode 101T. The electrolyte 101S allows oxide ions to pass but does not allow gas and electrons to pass. The electrolyte 101S is formed into a rectangular parallelepiped shape. The electrolyte 101S is made of a solid oxide ceramic, such as stabilized zirconia in which yttria, neodymium oxide, samaria, gadria, scandia, and the like are dissolved.

As shown in FIGS. 9 and 10, the anode 101T is a fuel electrode, and reacts an anode gas AG (for example, hydrogen) with oxide ions to thereby generate an oxide of the anode gas AG and extract electrons. The anode 101T is resistant to a reducing atmosphere, allows the anode gas AG to pass therethrough, has high electrical conductivity, and has a catalytic action to react the anode gas AG with the oxide ions. The anode 101T is formed into a rectangular parallelepiped shape that is larger than the electrolyte 101S. The anode 101T is made of cemented carbide in which, for example, a metal such as nickel and an oxide ion conductor such as yttria-stabilized zirconia are mixed.

As shown in FIGS. 9 and 10, the cathode 101U is an oxidant electrode, and reacts a cathode gas CG (for example, oxygen contained in air) with electrons to convert oxygen molecules to oxide ions. The cathode 101U is resistant to oxidizing atmosphere, allows the cathode gas CG to pass therethrough, has high electric conductivity, and has a catalytic action to convert oxygen molecules into oxide ions. The cathode 101U is formed into a rectangular parallelepiped shape that is smaller than the electrolyte 101S. The cathode 101U is made of an oxide of, for example, lanthanum, strontium, manganese, or cobalt.

As shown in FIGS. 9 and 10, the support metal 101V supports the power generation cells 101M on the anode 101T side. The support metal 101V has gas permeability, high electric conductivity, and sufficient strength. The support metal 101V is formed into a rectangular parallelepiped shape that is sufficiently larger than the anode 101T. The support metal 101V is made of, for example, stainless steel, corrosion-resistant steel, or a corrosion-resistant alloy containing nickel and chromium.

As shown in FIGS. 8-10, the cell frame 101W holds the metal support cell 101N from the periphery. The cell frame 101W is formed into a thin rectangular shape. The cell frame 101W is provided with a pair of openings 101k along the longitudinal direction Y. Each of the pair of openings 101k of the cell frame 101W is formed of a rectangular through-hole, and is slightly smaller than the outer shape of the support metal 101V. The cell frame 101W is made of metal, and is insulated with an insulating material or a coating. The insulating material is formed, for example, by fixing aluminum oxide onto the cell frame 101W. The outer edge of the support metal 101V is joined to the inner edge of the opening 101k of the cell frame 101W to thereby join the metal support cell assembly 101 to the cell frame 101W.

As shown in FIGS. 9 and 10, the cell frame 101W is provided with circular extended portions (first extended portion 101p, second extended portion 101q, and third extended portion 101r) extending in the planar direction from the right end, the center, and the left end of one side along the longitudinal direction Y. The cell frame 101W is provided with circular extended portions (fourth extended portion 101s and fifth extended portion 101t) extending in the planar direction from two locations separated from the center of the other side along the longitudinal direction Y. In the cell frame 101W, the fourth extended portion 101s and the fifth extended portion 101t are located alternatingly with respect to the first extended portion 101p, the second extended portion 101q, and the third extended portion 101r, and are separated therefrom by the pair of openings 101k in the longitudinal direction Y.

As shown in FIGS. 9 and 10, in the cell frame 101W, an anode-side first inlet 101a, an anode-side second inlet 101b, and an anode-side third inlet 101c through which the anode gas AG passes (flows) are provided in the first extended portion 101p, the second extended portion 101q, and the third extended portion 101r, respectively. In the cell frame 101W, an anode-side first outlet 101d and an anode-side second outlet 101e through which the anode gas AG passes (flows) are provided in the fourth extended portion 101s and the fifth extended portion 101t, respectively. The inlets and the outlets are so-called manifolds.

As shown in FIG. 9, in the cell frame 101W, a cathode-side first inlet 101f through which the cathode gas CG passes (flows) is provided in the space between the first extended portion 101*p* and the second extended portion 101*q*. In the cell frame 101W, a cathode-side second inlet 101*g* through which the cathode gas CG passes (flows) is provided in the space between the second extended portion 101*q* and the third extended portion 101*r*. In the cell frame 101W, a cathode-side first outlet 101*h* through which the cathode gas CG passes (flows) is provided on the right side of the fourth extended portion 101*s* in FIG. 9. In the cell frame 101W, a cathode-side second outlet 101*i* through which the cathode gas CG passes (flows) is provided in the space between the fourth extended portion 101*s* and the fifth extended portion 101*t*. In the cell frame 101W, a cathode-side third outlet 101*j* through which the cathode gas CG passes (flows) is provided on the left side of the fifth extended portion 101*t* in FIG. 9. In the cell frame 101W, the inlets and outlets of the cathode gas CG correspond to the space between the outer circumferential surface of the cell frame 101W and the inner-side surface of the air shelter 110.

Figure 15:
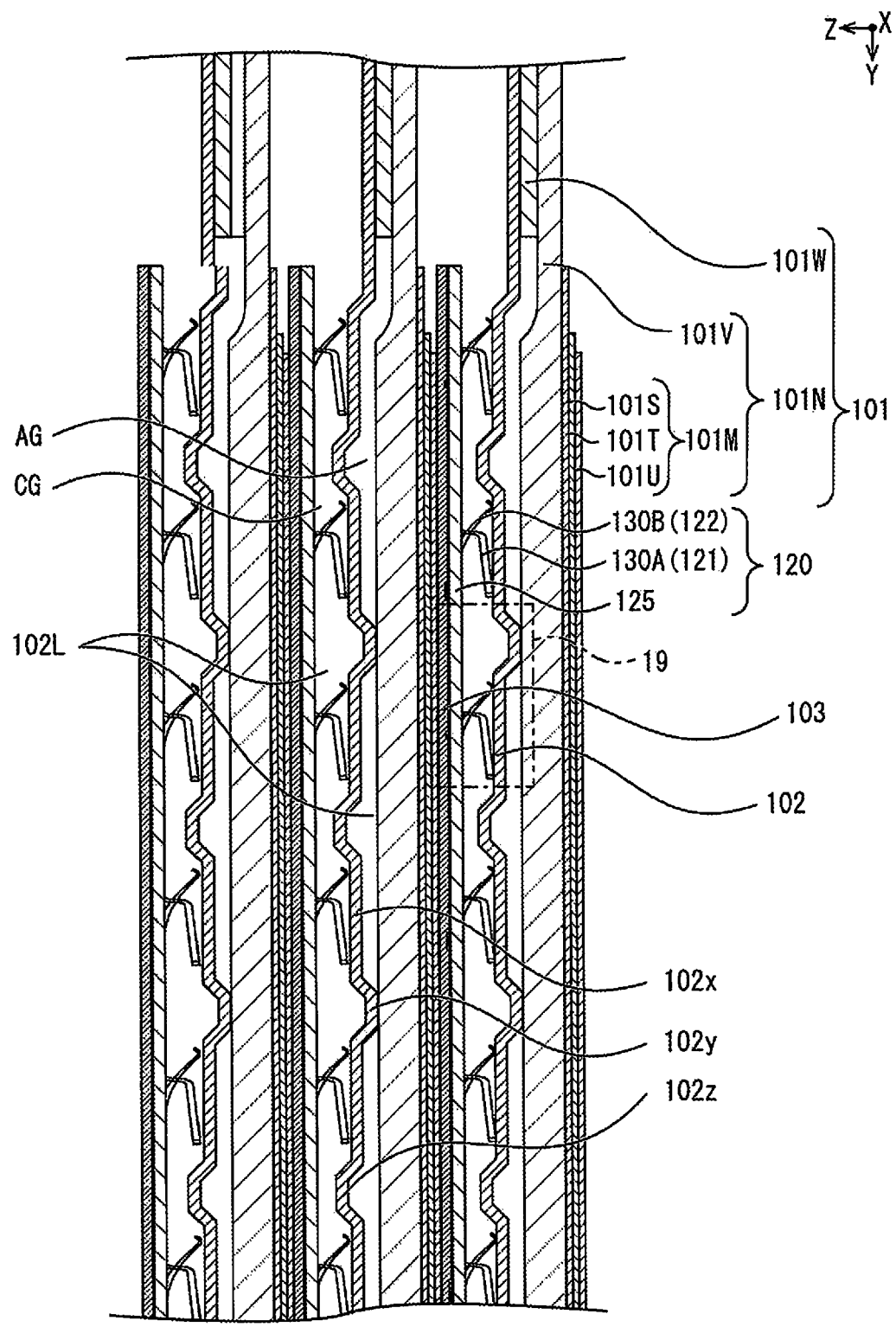
FIG. 15 is a cross-sectional view partially (region 15 in FIG. 11) illustrating a state in which an auxiliary collector layer, the separator, and the metal support cell assembly of FIG. 8 are stacked.

As shown in FIG. 15, the separator 102 defines flow path portions 102L, which are flow passages for the anode gas AG and the cathode gas CG between the separator and the power generation cells 101M. The separator 102 is in conductive contact with the metal support cell 101N.

The separator 102 is disposed opposing the metal support cell assembly 101. The separator 102 has the same outer shape as the metal support cell assembly 101. The separator 102 is made of metal, and is insulated using an insulating material or a coating, excluding regions (flow path portions 102L) opposing the pair of power generation cells 101M. The insulating material is formed, for example, by fixing aluminum oxide onto the separator 102. The separator 102 is provided with a pair of the flow path portions 102L arranged side by side in the longitudinal direction Y so as to oppose the pair of power generation cells 101M.

Figure 11:
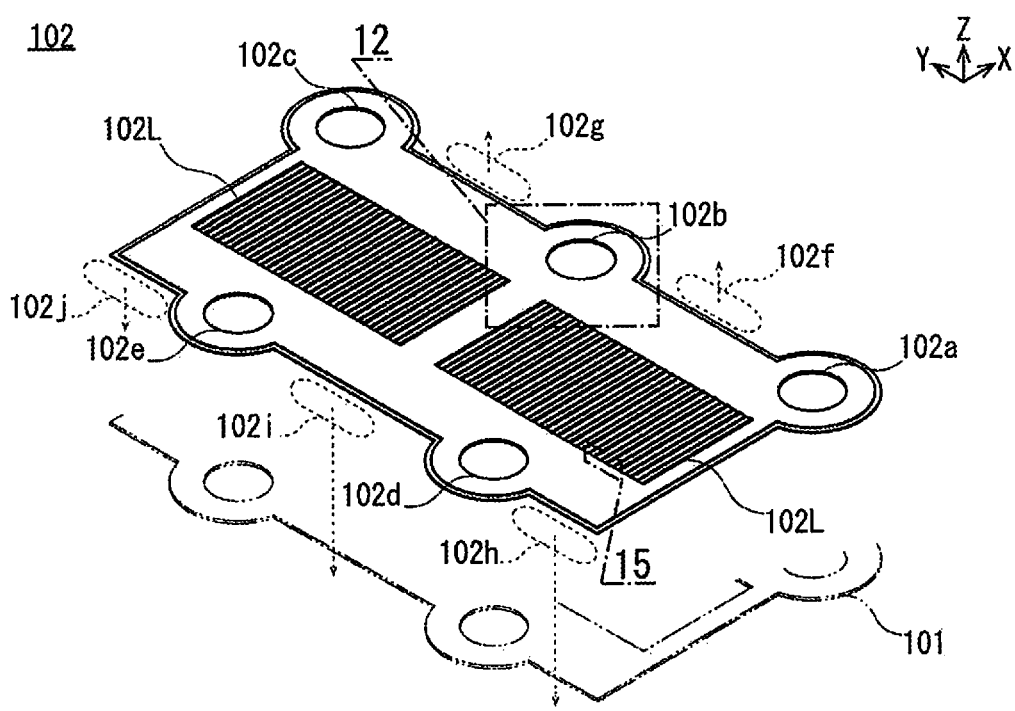
FIG. 11 is a perspective view illustrating the separator of FIG. 8 from a cathode side (side in which the separator. 102 is viewed from above as in FIG. 8).
Figure 12:
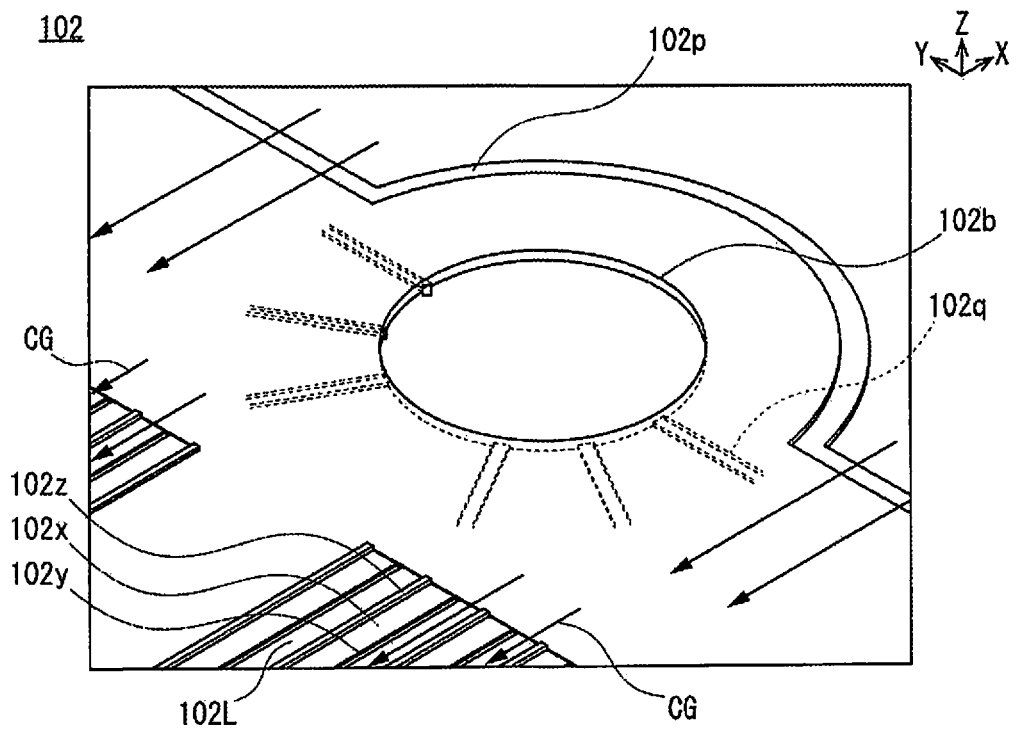
FIG. 12 is a perspective view partially (region 12 in FIG. 11) illustrating the separator of FIG. 11.
Figure 13:
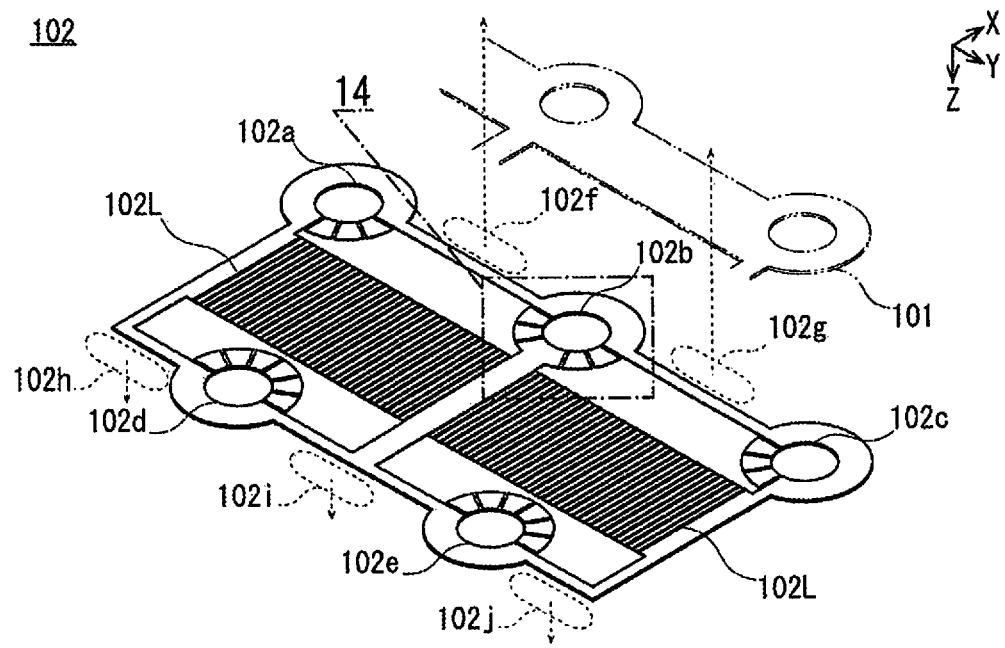
FIG. 13 is a perspective view illustrating the separator of FIG. 8 from an anode side (side in which the separator 102 is viewed from below, unlike in FIG. 8).
Figure 14:
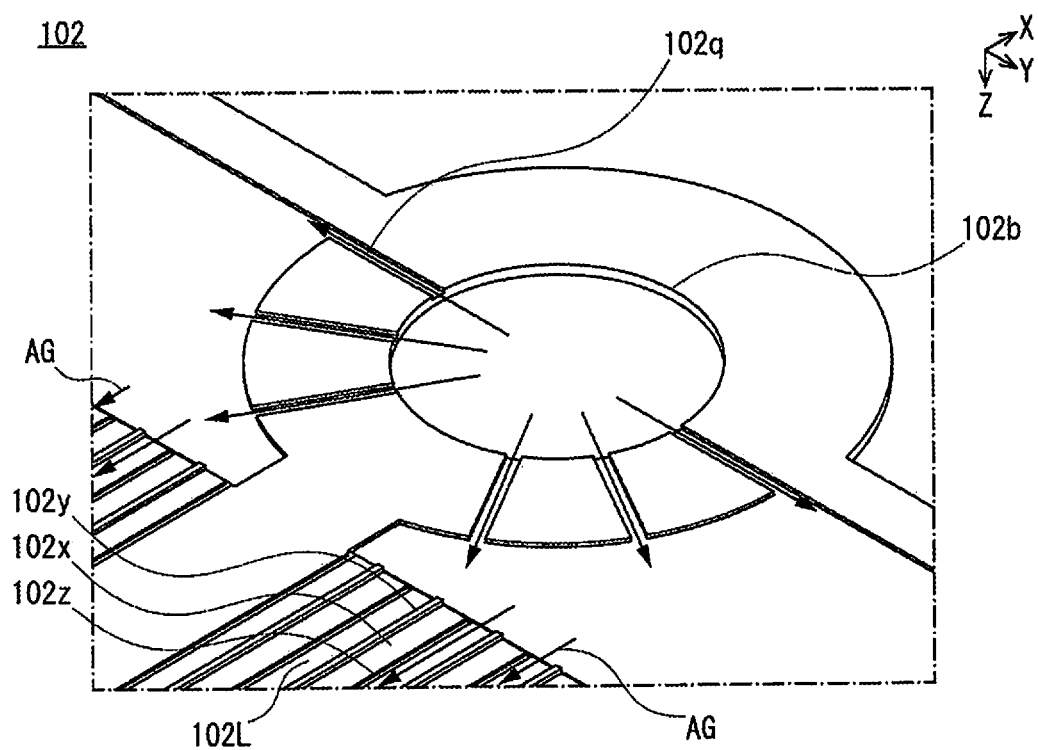
FIG. 14 is a perspective view partially (region 14 in FIG. 13) illustrating the separator of FIG. 13.

As shown in FIG. 8 as well as FIGS. 11-15, in the separator 102, the flow path portions 102L are formed by arranging flow paths that extend along the direction of the flow of the gas (transverse direction X), in the direction (longitudinal direction Y) orthogonal to the direction of the flow of the gas (transverse direction X). As shown in FIGS. 12, 14, and 15, concave portions 102*y* are provided in the flow path portions 102L at regular intervals, so as to be recessed downward from flat portions 102*x*, in a plane defined by the longitudinal direction Y and the transverse direction X. The concave portions 102*y* extend along the direction of the flow of the gas (transverse direction X). The concave portions 102*y* are slightly recessed downward from the lower end of the separator 102. As shown in FIGS. 12, 14, and 15, convex portions 102*z* are provided in the flow path portions 102L at regular intervals, so as to protrude upward from the flat portions 102*x*. The convex portions 102*z* extend along the direction of the flow of the gas (transverse direction X). The convex portions 102*z* slightly protrude upward from the upper end of the separator 102. In the flow path portions 102L, the concave portions 102*y* and the convex portions 102*z* are alternatingly provided along the longitudinal direction Y, separated by the flat portions 102*x*.

As shown in FIG. 15, in the separator 102, the gap between the flow path portion 102L and the metal support cell assembly 101 located below (on the right in FIG. 15) is configured to be the flow path of the anode gas AG. The anode gas AG flows from an anode-side second inlet 102*b* of the separator 102 shown in FIG. 13, and the like, through a plurality of grooves 102*q* shown in FIGS. 13 and 14, into the flow path portion 102L on the anode side. As shown in FIGS. 13 and 14, in the separator 102, the plurality of grooves 102*q* are formed from each of an anode-side first inlet 102*a*, the anode-side second inlet 102*b*, and an anode-side third inlet 102*c*, radially toward the flow path portion 102L on the anode side. As shown in FIGS. 12 and 15, in the separator 102, the gap between the flow path portion 102L and the metal support cell assembly 101 located above (on the left in FIG. 15) is configured to be the flow path of the cathode gas CG. The cathode gas CG flows from a cathode-side first inlet 102*f* and a cathode-side second inlet 102*g* of the separator 102 shown in FIG. 11, over an outer edge 102*p* on the cathode side of the separator 102 shown in FIGS. 11 and 12, into the flow path portion 102L on the cathode side. As shown in FIG. 12, in the separator 102, the outer edge 102*p* on the cathode side is formed to be thinner than the other portions.

As shown in FIGS. 8, 11, and 13, the separator 102 is provided with the anode-side first inlet 102*a*, the anode-side second inlet 102*b*, the anode-side third inlet 102*c*, an anode-side first outlet 102*d*, and an anode-side second outlet 102*e* through which the anode gas AG passes, such that the relative position with the metal support cell assembly 101 matches along the stacking direction Z. The separator 102 is provided with the cathode-side first inlet 102*f*, the cathode-side second inlet 102*g*, a cathode-side first outlet 102*h*, a cathode-side second outlet 102*i*, and a cathode-side third outlet 102*j* through which the cathode gas CG passes, such that the relative position with the metal support cell assembly 101 matches along the stacking direction Z. In the separator 102, the inlets and outlets of the cathode gas CG correspond to the space between the outer circumferential surface of the separator 102 and the inner-side surface of the air shelter 110.

As shown in FIG. 15, the grid spring 120 is in conductive contact with the power generation cell 101M via an auxiliary collector layer 103.

The auxiliary collector layer 103 forms a space through which the cathode gas CG passes between the power generation cell 101M and the grid spring 120, equalizes the surface pressure, and assists the electrical contact between the power generation cell 101M and the grid spring 120.

The auxiliary collector layer 103 is a so-called expanded metal. The auxiliary collector layer 103 is disposed between the power generation cell 101M and the flow path portions 102L of the separator 102. The auxiliary collector layer 103 has the same outer shape as the power generation cell 101M. The auxiliary collector layer 103 has a wire mesh shape in which rhomboidal, etc., openings are provided in a lattice pattern.

The sealing members 104 are so-called gaskets, which function as a spacer and a seal.

As shown in FIGS. 8 and 9, the sealing members 104 are disposed between the cell frame 101W and the separator 102 and partially seal the gap between the cell frame 101W and the separator 102 to thereby restrict the flow of the gas.

The sealing members 104 prevent the anode gas AG from becoming mixed toward the cathode-side flow path of the separator 102 from an anode-side inlet (for example, the anode-side first inlet 102*a*) and an anode-side outlet (for example, anode-side first outlet 102*d*) of the separator 102.

As shown in FIGS. 5 to 7, the module end 105 is a plate that holds the lower end or the upper end of the plurality of stacked cell units 100T.

The module end 105 is disposed at the lower end or the upper end of the plurality of stacked cell units 100T. The module end 105 has the same outer shape as the cell units 100T. The module end 105 is made of a conductive material that does not allow gas to permeate therethrough, and, except for partial regions that oppose the power generation cells 101M and the other module ends 105, is insulated using an insulating material or a coating. The insulating material is formed, for example, by fixing aluminum oxide onto the module end 105.

The module end 105 is provided with an anode-side first inlet 105a, an anode-side second inlet 105b, an anode-side third inlet 105c, an anode-side first outlet 105d, and an anode-side second outlet 105e through which the anode gas AG passes, such that the relative position with the cell units 100T matches along the stacking direction Z. The module end 105 is provided with a cathode-side first inlet 105f, a cathode-side second inlet 105g, a cathode-side first outlet 105h, a cathode-side second outlet 105i, and a cathode-side third outlet 105j through which the cathode gas CG passes, such that the relative position with the cell units 100T matches along the stacking direction Z. In the module end 105, the inlets and outlets of the cathode gas CG correspond to the space between the outer circumferential surface of the module end 105 and the inner-side surface of the air shelter 110.

The upper collector plate 106 is shown in FIG. 5, and outputs electric power generated by the cell units 100T to the outside.

The upper collector plate 106 is positioned at the upper end of the upper module unit 100P. The upper collector plate 106 has the same outer shape as the cell units 100T. The upper collector plate 106 is provided with a terminal (not shown) that is connected to an external energizing member. The upper collector plate 106 is made of a conductive material that does not allow gas to permeate therethrough, and is insulated using an insulating material or a coating, excluding the terminal portion and regions that oppose the power generation cells 101M of the cell units 100T. The insulating material is formed, for example, by fixing aluminum oxide onto the upper collector plate 106.

The lower collector plate 107 is shown in FIG. 7, and outputs electric power generated by the cell units 100T to the outside.

The lower collector plate 107 is positioned at the lower end of the lower module unit 100R. The lower collector plate 107 has the same outer shape as the upper collector plate 106. The lower collector plate 107 is provided with a terminal (not shown) that is connected to an external energizing member. The lower collector plate 107 is made of a conductive material that does not allow gas to permeate therethrough, and, except for the terminal portion and regions that oppose the power generation cells 101M of the cell units 100T, is insulated with an insulating material or a coating. The insulating material is formed, for example, by fixing aluminum oxide onto the lower collector plate 107.

The lower collector plate 107 is provided with an anode-side first inlet 107a, an anode-side second inlet 107b, an anode-side third inlet 107c, an anode-side first outlet 107d, and an anode-side second outlet 107e through which the anode gas AG passes, such that the relative position with the cell units 100T matches along the stacking direction Z. The lower collector plate 107 is provided with a cathode-side first inlet 107f, a cathode-side second inlet 107g, a cathode-side first outlet 107h, a cathode-side second outlet 107i, and a cathode-side third outlet 107j through which the cathode gas CG passes, such that the relative position with the cell units 100T matches along the stacking direction Z. In the lower collector plate 107, the inlets and outlets of the cathode gas CG correspond to the space between the outer circumferential surface of the lower collector plate 107 and the inner-side surface of the air shelter 110.

As shown in FIGS. 2 and 3, the lower end plate 108 holds the fuel cell stack 100S from below.

The lower end plate 108 is disposed at the lower end of the fuel cell stack 100S. Except for a portion, the lower end plate 108 has the same outer shape as the cell units 100T. Two ends of the lower end plate 108 are formed by linearly extending both ends along the longitudinal direction Y, in order to form an inlet and an outlet for the cathode gas CG. The lower end plate 108 is formed sufficiently thicker than the cell units 100T. The lower end plate 108 is made of metal, for example, and the upper surface thereof that contacts the lower collector plate 107 is insulated using an insulating material or a coating. The insulating material is formed, for example, by fixing aluminum oxide onto the lower end plate 108.

The lower end plate 108 is provided with an anode-side first inlet 108a, an anode-side second inlet 108b, an anode-side third inlet 108c, an anode-side first outlet 108d, and an anode-side second outlet 108e through which the anode gas AG passes, such that the relative position with the cell units 100T matches along the stacking direction Z. The lower end plate 108 is provided with a cathode-side first inlet 108f, a cathode-side second inlet 108g, a cathode-side first outlet 108h, a cathode-side second outlet 108i, and a cathode-side third outlet 108j through which the cathode gas CG passes, such that the relative position with the cell units 100T matches along the stacking direction Z.

As shown in FIGS. 2 and 3, the upper end plate 109 holds the fuel cell stack 100S from above.

The upper end plate 109 is disposed at the upper end of the fuel cell stack 100S. The upper end plate 109 has the same outer shape as the lower end plate 108. Unlike the lower end plate 108, the upper end plate 109 is not provided with an inlet and an outlet for the gas. The upper end plate 109 is made of metal, for example, and the lower surface thereof that contacts the upper collector plate 106 is insulated using an insulating material or a coating. The insulating material is formed, for example, by fixing aluminum oxide onto the upper end plate 109.

As shown in FIGS. 2 and 3, the air shelter 110 forms a flow path for the cathode gas CG between the air shelter and the fuel cell stack 100S.

The air shelter 110 covers the fuel cell stack 100S, which is sandwiched between the lower end plate 108 and the upper end plate 109, from the top. The air shelter 110 forms the inlet and the outlet for the cathode gas CG, which is a constituent element of the fuel cell stack 100S, with a gap between the inner-side surface of the air shelter 110 and the side surface of the fuel cell stack 100S. The air shelter 110 has a box-like shape, with the entire lower portion and part of the side portion open. The air shelter 110 is made of metal, for example, and the inner-side surface thereof is insulated using an insulating material or a coating. The insulating material is formed, for example, by fixing aluminum oxide onto the air shelter 110.

As shown in FIGS. 1 and 2, the external manifold 111 supplies gas from the outside to the plurality of cell units 100T.

The external manifold 111 is disposed below the cell stack assembly 100M. The external manifold 111 has an outer shape obtained by simplifying the shape of the lower end plate 108. The external manifold 111 is formed sufficiently thicker than the lower end plate 108. The external manifold 111 is made of metal, for example.

The external manifold 111 is provided with an anode-side first inlet 111a, an anode-side second inlet 111b, an anode-side third inlet 111c, an anode-side first outlet 111d, and an anode-side second outlet 111e through which the anode gas AG passes, such that the relative position with the cell units 100T matches along the stacking direction Z. The external manifold 111 is provided with a cathode-side first inlet 111 f, a cathode-side second inlet 111g, a cathode-side first outlet 111h, a cathode-side second outlet 111i, and a cathode-side third outlet 111j through which the cathode gas CG passes, such that the relative position with the cell units 100T matches along the stacking direction Z.

As shown in FIGS. 1 and 2, the cover 112 covers and protects the cell stack assembly 100M.

The cover 112 sandwiches the cell stack assembly 100M from above and below, together with the external manifold 111. The cover 112 has a box-like shape, with an open lower portion. The cover 112 is made of metal, for example, the inner surface of which is insulated with an insulating material.

Flow of Gas in Fuel Cell Stack 100S

Figure 16A:
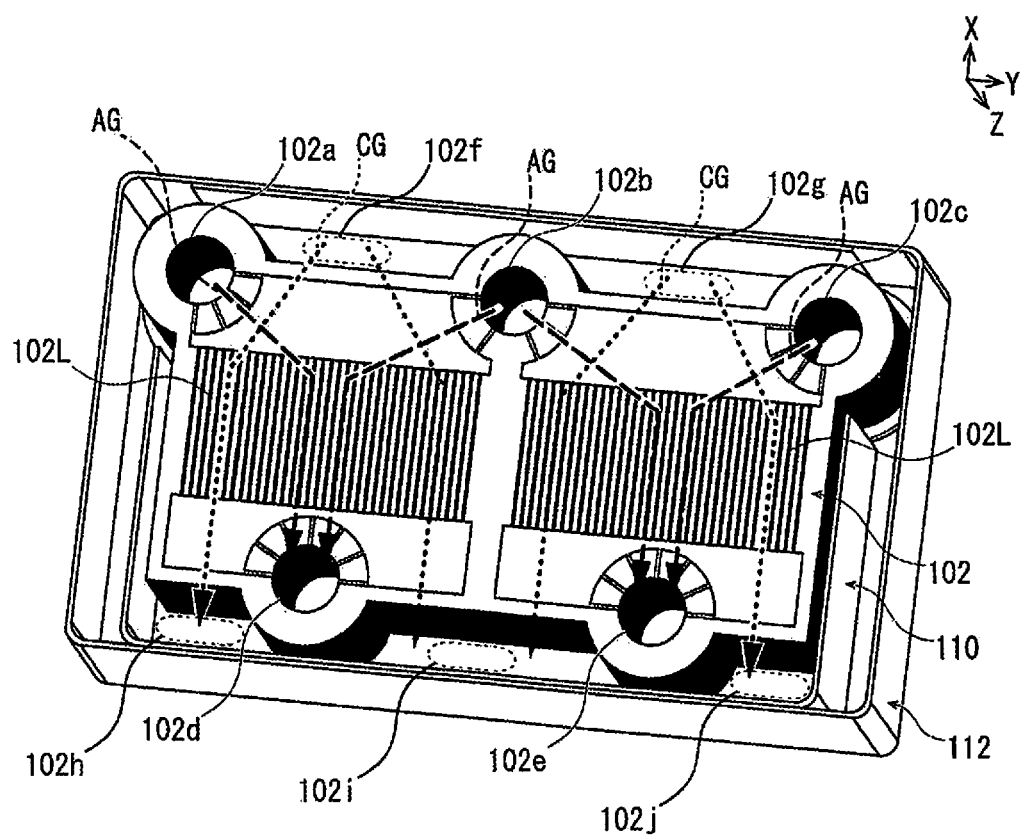
FIG. 16A is a perspective view schematically illustrating the flow of anode gas and cathode gas in the fuel cell stack.
Figure 16B:
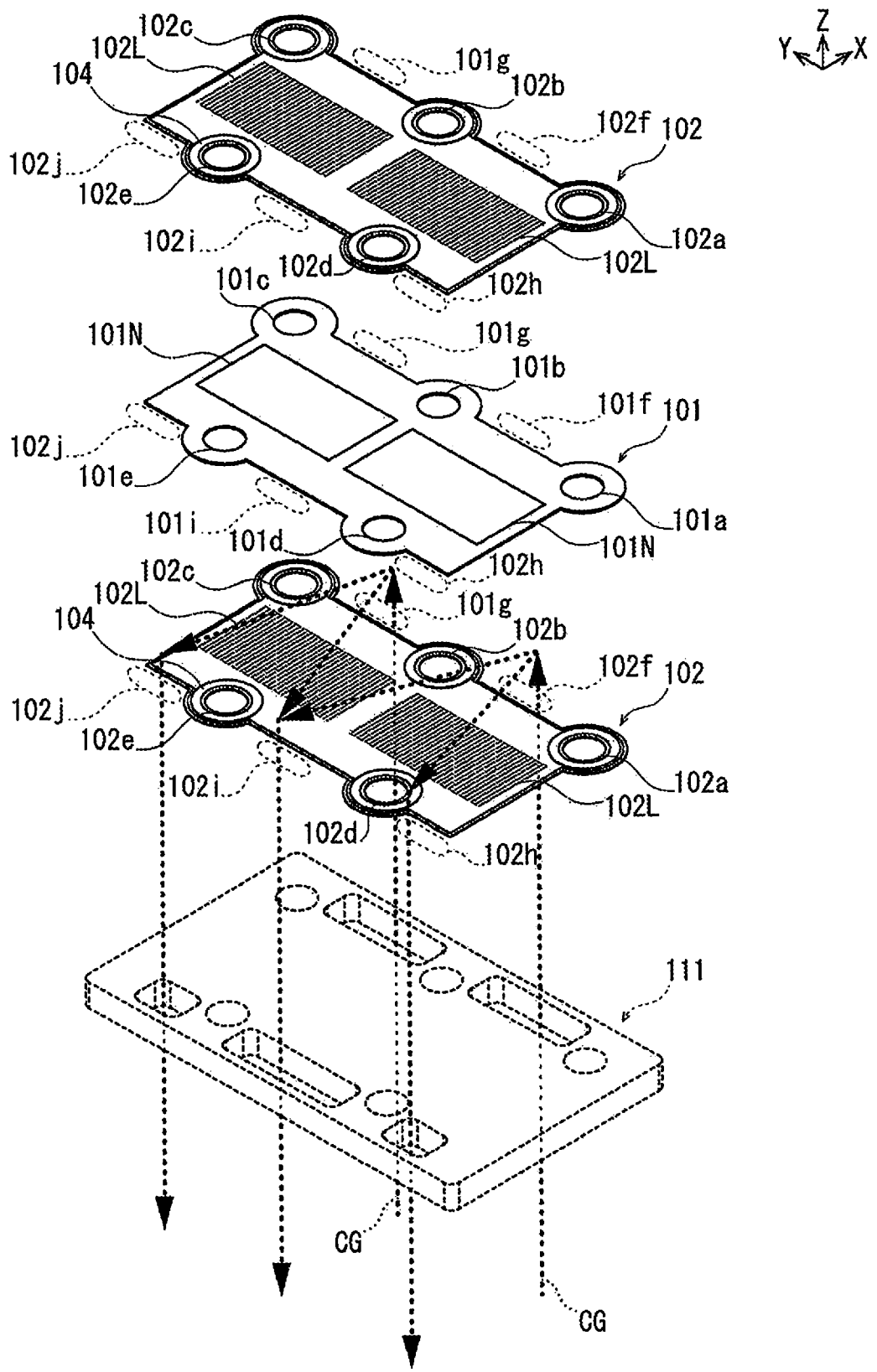
FIG. 16B is a perspective view schematically illustrating the flow of the cathode gas in the fuel cell stack.
Figure 16C:
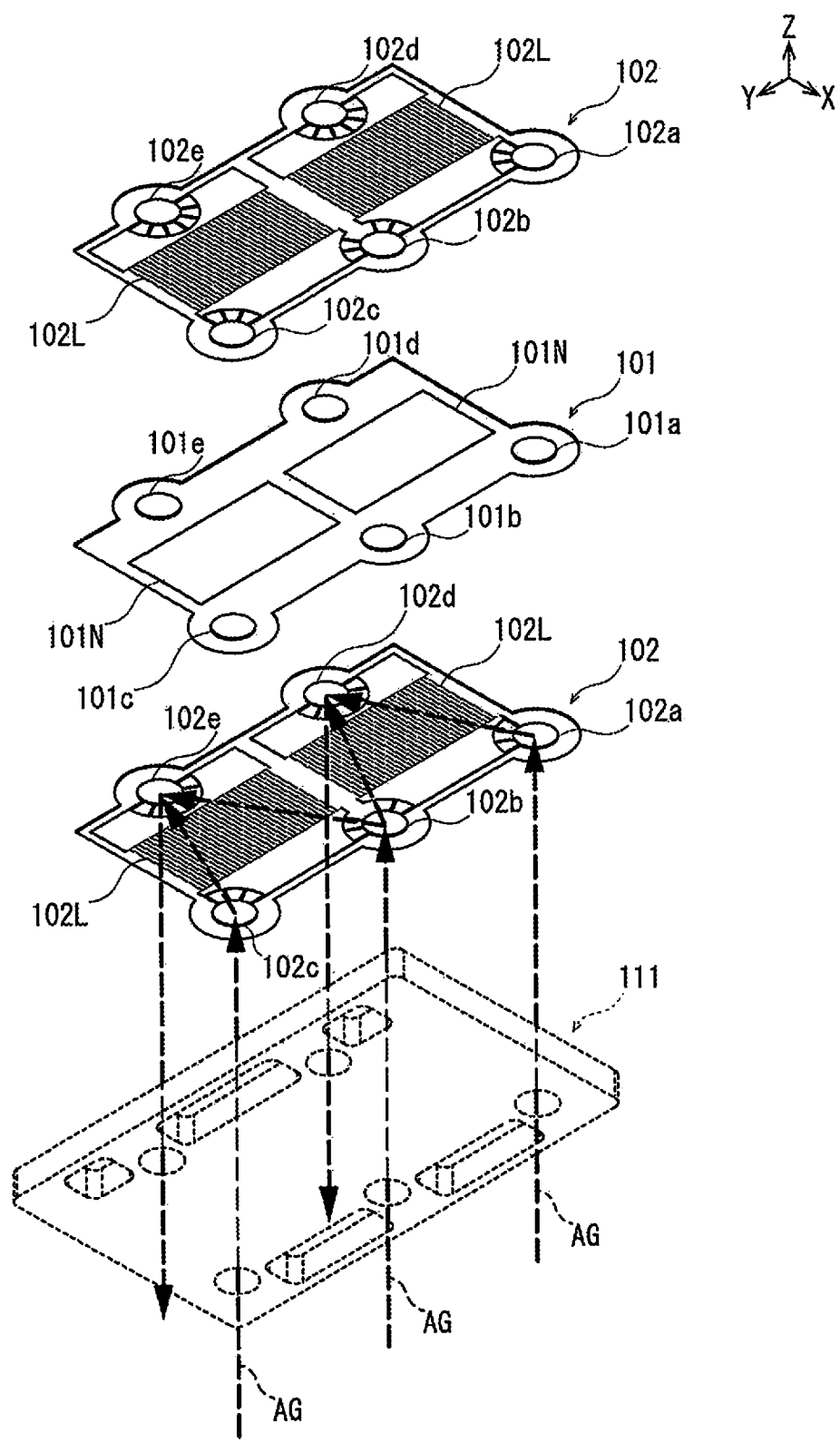
FIG. 16C is a perspective view schematically illustrating the flow of the anode gas in the fuel cell stack.
Figure 17:
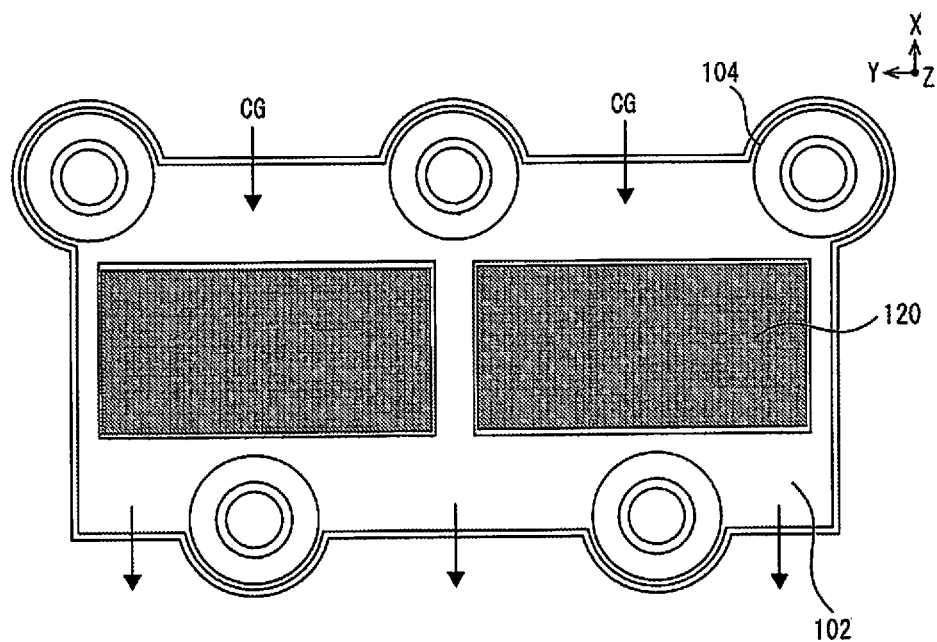
FIG. 17 is a plan view illustrating the cell unit according to an embodiment, with the auxiliary collector layer omitted.
Figure 18A:
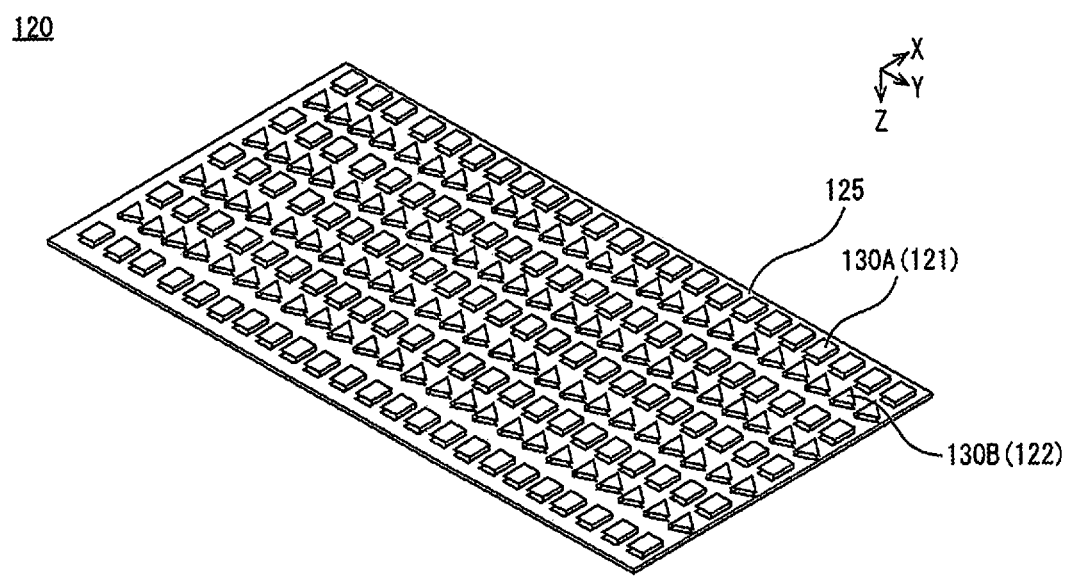
FIG. 18A is a perspective view of the grid spring according to the embodiment.
Figure 18B:
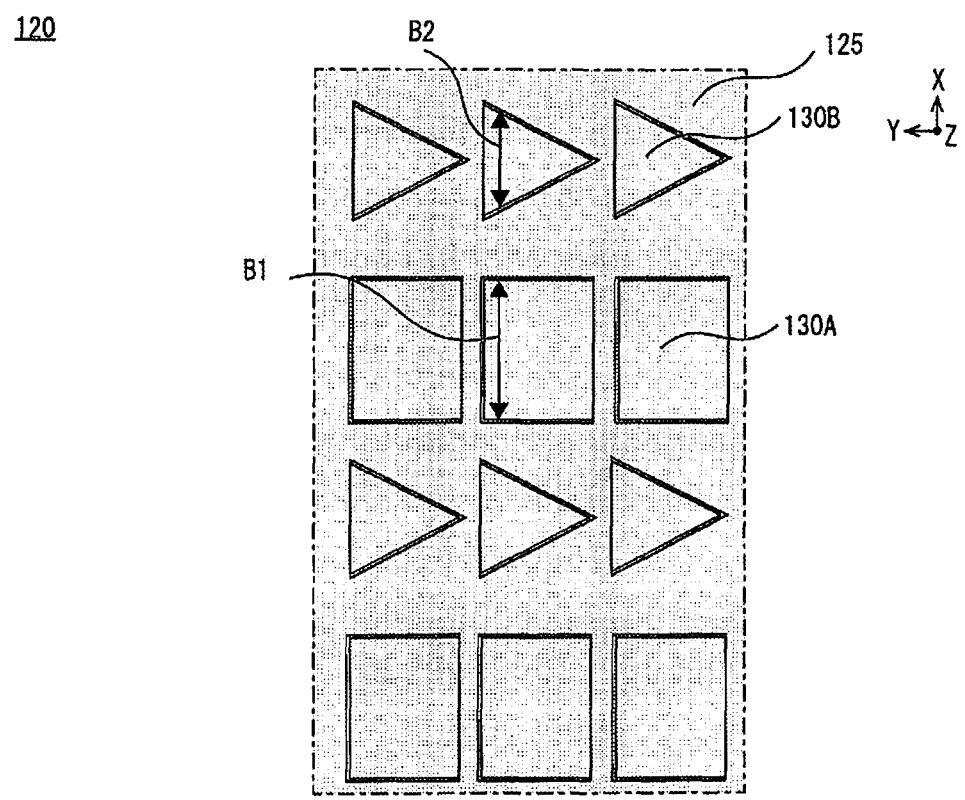
FIG. 18B is a plan view illustrating a part of the grid spring according to the embodiment.
Figure 19:
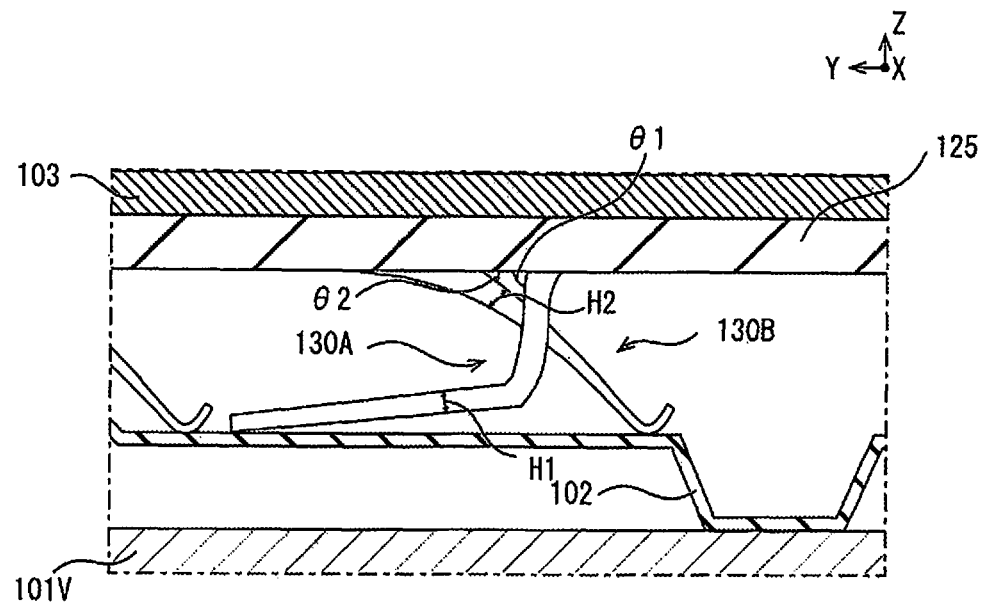
FIG. 19 is an enlarged view of the region surrounded by the broken line 19 in FIG. 15.

FIG. 16A is a perspective view schematically illustrating the flow of the anode gas AG in the fuel cell stack 100S. FIG. 16B is a perspective view schematically illustrating the flow of the cathode gas CG in the fuel cell stack 100S.

The anode gas AG passes through the respective inlets of the external manifold 111, the lower end plate 108, the module end 105, the separator 102, and the metal support cell assembly 101, and is supplied to the anode 101T of each of the power generation cells 101M. That is, the anode gas AG is distributed and supplied to the flow path on the anode side provided in the gap between the separator 102 and the metal support cell assembly 101, which are stacked in alternating fashion from the external manifold 111 to the terminal upper collector plate 106. Thereafter, the anode gas AG reacts in the power generation cells 101M, passes through the respective outlets of each of the constituent elements described above, and is discharged in the form of exhaust gas.

In FIG. 16A, the anode gas AG passes through the anode-side first inlet 102a, the anode-side second inlet 102b, and the anode-side third inlet 102c of the separator 102 positioned below in FIG. 16A, passes through the anode-side first inlet 101a, the anode-side second inlet 101b, and the anode-side third inlet 101c of the metal support cell assembly 101, then flows into the flow path portions 102L of the separator 102 positioned above in FIG. 16A, and is supplied to the anodes 101T of the power generation cells 101M of the metal support cell assembly 101. The anode gas AG that has reacted in the anode 101T flows out of the flow path portions 102L of the separator 102 positioned above in FIG. 16A in the form of exhaust gas, passes through the anode-side first outlet 101d and the anode-side second outlet 101e of the metal support cell assembly 101, passes through the anode-side first outlet 102d and the anode-side second outlet 102e of the separator 102 positioned below in FIG. 16A, and is discharged to the outside.

The cathode gas CG passes through the respective inlets of the external manifold 111, the lower end plate 108, the module end 105, the separator 102, and the metal support cell assembly 101, and is supplied to the cathodes 101U of the power generation cells 101M. That is, the cathode gas CG is distributed and supplied to the flow path on the cathode side provided in the gap between the metal support cell assembly 101 and the separator 102, which are stacked in alternating fashion from the external manifold 111 to the terminal upper collector plate 106. The cathode gas CG then reacts in the power generation cells 101M, passes through the respective outlets of each of the constituent elements described above, and is discharged in the form of exhaust gas. The inlet and the outlet of the cathode gas CG in each of the constituent elements described above are configured by the gaps between the outer circumferential surface of each constituent element and the inner-side surface of the air shelter 110.

In FIG. 16B, the cathode gas CG passes through the cathode-side first inlet 102f and the cathode-side second inlet 102g of the separator 102 positioned below in FIG. 16B, flows into the flow path portions 102L of the separator 102, and is supplied to the cathodes 101U of the power generation cells 101M of the metal support cell assembly 101. The cathode gas CG that has reacted in the cathode 101U flows out of the flow path portions 102L of the separator 102 positioned below in FIG. 16B in the form of exhaust gas, passes through the cathode-side first outlet 102h, the cathode-side second outlet 102i, and the cathode-side third outlet 102j of the separator 102, and is discharged to the outside.

Grid Spring 120

As shown in FIGS. 15, 17, 18A, and 18B, the grid spring 120 (corresponding to the spring member) includes a first spring member 121 that generates elastic force for pressing the separator 102 toward the power generation cell 101M, and a second spring member 122 that generates elastic force independently of the first spring member 121.

The grid spring 120 has a flat substrate 125 (corresponding to a first base portion and a second base portion).

The first spring member 121 has a plurality of elastically deformable first raised pieces 130A (corresponding to spring portions) that are raised so as to be cantilevered from the substrate 125. The second spring member 122 has a plurality of elastically deformable second raised pieces 130B (corresponding to spring portions) that are raised so as to be cantilevered from the substrate 125.

The raised pieces 130A, 130B function as a spring that generates surface pressure between the substrate 125 and the cathode 101U as well as between the separator 102 and the anode 101T, by generating elastic force in the stacking direction Z.

The raised pieces 130A, 130B are arranged in the planar direction of the substrate 125. The first raised pieces 130A are arranged at the corners and the center of the substrate 125. The first raised pieces 130A and the second raised pieces 130B are arranged in alternating fashion such that the raised directions thereof are opposite each other in the longitudinal direction Y. The installation area occupied by the first raised pieces 130A on the substrate 125 is between 10% and 60%, preferably between 20% and 50%.

The spring constant k1 of the first raised pieces 130A decreases when the grid spring 120 is heated. The heating temperature and the heating time of the grid spring 120 will be described further below in the method for manufacturing the fuel cell stack 100S.

Before the grid spring 120 is heated, the spring constant k1 of the first raised pieces 130A is larger than the spring constant k2 of the second raised pieces 130B, so that the grid spring 120 functions as a high reaction force spring. In the present Specification, "high reaction force spring" means a spring that generates a reaction force necessary for supporting components to be assembled when the cell units 100T are stacked. The reaction force necessary for supporting the components to be assembled is about 100 N, for example. The ratio between the spring constant k1 of the first raised pieces 130A and the spring constant k2 of the second raised pieces 130B before the grid spring 120 is heated is about k1:k2=1.5 to 3:1.

After the grid spring 120 is heated, the grid spring 120 functions as a low reaction force spring, since the spring constant k1 of the first raised pieces 130A decreases with applied heat. In the present Specification, "low reaction force spring" means a spring that generates a reaction force necessary for absorbing displacement and deformation of members (the separator 102 and the power generation cells 101M) in the stacking direction Z. The reaction force necessary for absorbing displacement and deformation of members in the stacking direction Z is, for example, about 50% to 80% of the reaction force necessary for supporting the components to be assembled described above. The ratio between the spring constant k11 of the first raised pieces 130A before heating and the spring constant k12 of the first raised pieces 130A after heating is about k11:k12=1:0.2 to 0.5.

Before the grid spring 120 is heated, the reaction force generated by the first raised pieces 130A is greater than the reaction force generated by the second raised pieces 130B, since the spring constant k1 of the first raised pieces 130A is larger than the spring constant k2 of the second raised pieces 130B. Thus, the stress that acts on the first raised pieces 130A is greater than the stress that acts on the second raised pieces 130B. Therefore, when the grid spring 120 is heated, the first raised pieces 130A undergo creep deformation preferentially over the second raised pieces 130B, and the spring constant k1 of the first raised pieces 130A decreases.

After the grid spring 120 is heated, the spring constant k1 of the first raised pieces 130A is less than or equal to the spring constant k2 of the second raised pieces 130B.

The first raised pieces 130A curve and extend from the substrate 125 toward the separator 102, and the distal end portions thereof contact the separator 102. The second raised pieces 130B curve and extend from the substrate 125 toward the separator 102, and the distal end portions thereof contact the separator 102. The raised pieces 130 undergo bending deformation, thereby generating the elastic force in the stacking direction Z of the cell units 100T.

The bending angle θ1 of the first raised pieces 130A with respect to the substrate 125 is larger than the bending angle θ2 of the second raised pieces 130B with respect to the substrate 125.

The plate thickness H1 of the first raised pieces 130A is essentially constant from the substrate 125 to the separator 102. The plate thickness H2 of the second raised pieces 130B decreases from the substrate 125 to the separator 102.

The section modulus of the first raised pieces 130A is larger than the section modulus of the second raised pieces 130B.

As shown in FIG. 17B, the width B1 of the first raised pieces 130A is larger than the width B2 of the second raised pieces 130B. The width B2 of the second raised pieces 130B decreases from the substrate 125 to the separator 102.

The width B1 and the plate thickness H1 of the first raised pieces 130A and the width B2 and the plate thickness H2 of the second raised pieces 130B are not particularly limited as long as the section modulus of the first raised pieces 130A is larger than the section modulus of the second raised pieces 130B.

Method for Manufacturing Fuel Cell Stack 100S

The method for manufacturing the fuel cell stack 100S comprises a Step S1 for stacking the cell units 100T and a Step S2 for reducing the spring constant K of the grid spring 120.

In the Step S1 for stacking the cell units 100T, a grid spring 120 provided with the first raised pieces 130A that generate elastic force for pressing the separator 102 toward the power generation cell 101M and the second raised pieces 130B that generate elastic force independently of the first raised pieces 130A is disposed.

When the grid spring 120 is disposed, the grid spring 120 that functions as a high reaction force spring as a result of the spring constant k1 of the first raised pieces 130A being larger than the spring constant k2 of the second raised pieces 130B is disposed.

Figure 20A:
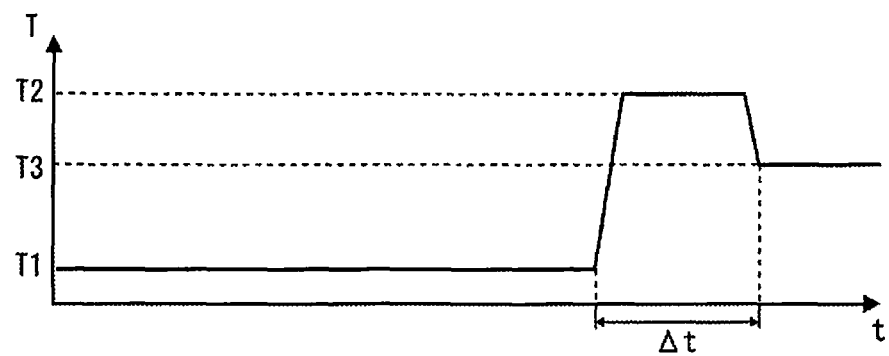
FIG. 20A is a view for explaining a method for manufacturing a fuel cell stack according to the embodiment, illustrating the heat history of the fuel cell stack.

As shown in FIG. 20A, in the Step S2 for reducing the spring constant K of the grid spring 120, for a period of time Δt, the grid spring 120 is heated from a first temperature T1 to a second temperature T2, thereby subjecting the first raised pieces 130A to creep deformation. The spring constant k1 of the first raised pieces 130A thus decreases. As the spring constant k1 of the first raised pieces 130A decreases, the spring constant K of the grid spring 120 decreases, and the grid spring 120 starts to function as a low reaction force spring.

When the fuel cell stack 100S is used, the second temperature T2 is higher than the temperature T3. The first temperature T1 is normal temperature, the second temperature T2 is about 700° C., and the temperature T3 is about 600° C. The heating time Δt is about one hour.

The heating of the grid spring 120 is carried out during a trial operation of the fuel cell stack 100S before shipment of the fuel cell stack 100S. The heating of the grid spring 120 is carried out using thermal energy generated from the power generation cells 101M during the trial operation of the fuel cell stack 100S and thermal energy of the high-temperature cathode 101U gas that is supplied to the power generation cells 101M.

Figure 20B:
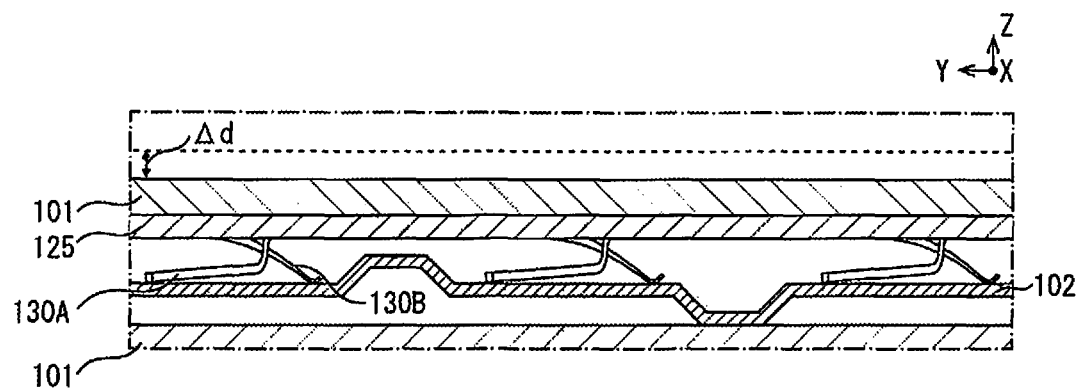
FIG. 20B is a view for explaining the method for manufacturing a fuel cell stack according to the embodiment, and is a schematic cross-sectional view illustrating a part of the fuel cell stack.

As shown in FIG. 20B, in the Step S1 for stacking the cell units 100T, one of the power generation cells 101M and the separator 102 are brought relatively closer to each other by distance Δd, to thereby apply stress to the first spring member 121 that is greater than the yield point, and cause the first spring member 121 to yield.

Operation of Fuel Cell Stack 100S

As described above, the grid spring 120 includes the first raised pieces 130A that generate elastic force for pressing the separator 102 toward the power generation cell 101M and the second raised pieces 130B that generate elastic force for pressing the separator 102 toward the power generation cell 101M independently of the first raised pieces 130A.

Figure 21A:
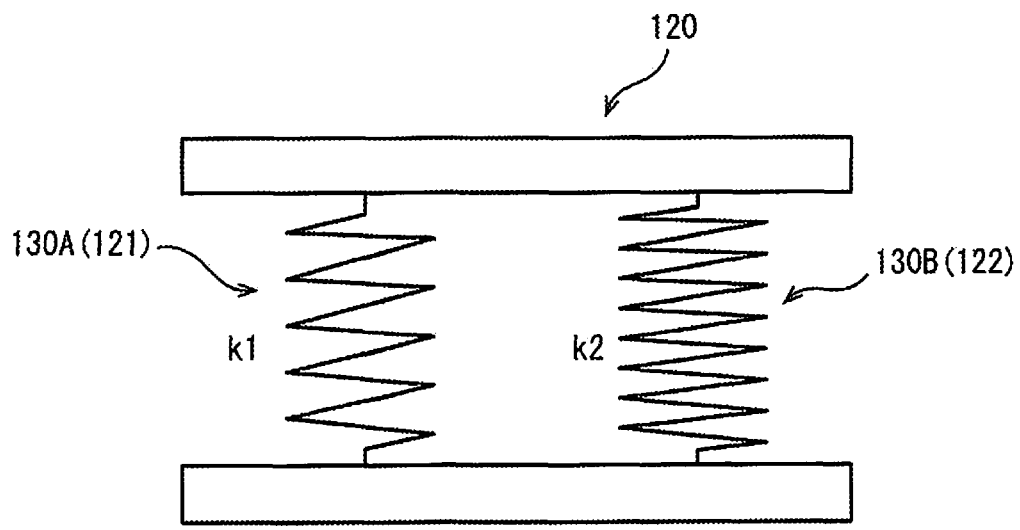
FIG. 21A is a schematic view for explaining the spring constant of a grid spring according to the embodiment.

As shown in FIG. 21A, the grid spring 120 can be understood as a spring in which first raised pieces 130A and second raised pieces 130B, each of which functions as an independent spring, are connected in parallel. As shown by the following equation, the spring constant K of the grid spring 120 is equal to the sum of the spring constant k1 of the first raised pieces 130A and the spring constant k2 of the second raised pieces 130B.

$$\Sigma K = \Sigma k_1 + \Sigma k_2 \qquad \text{Equation 1}$$

Before the grid spring 120 is heated, the spring constant k1 of the first raised pieces 130A is larger than the spring constant k2 of the second raised pieces 130B. As a result, before the grid spring 120 is heated, the spring constant k1 of the first raised pieces 130A is predominant, as shown by the following equation.

$$\Sigma K \cong \Sigma k_1 \qquad \text{Equation 2}$$

Figure 21B:
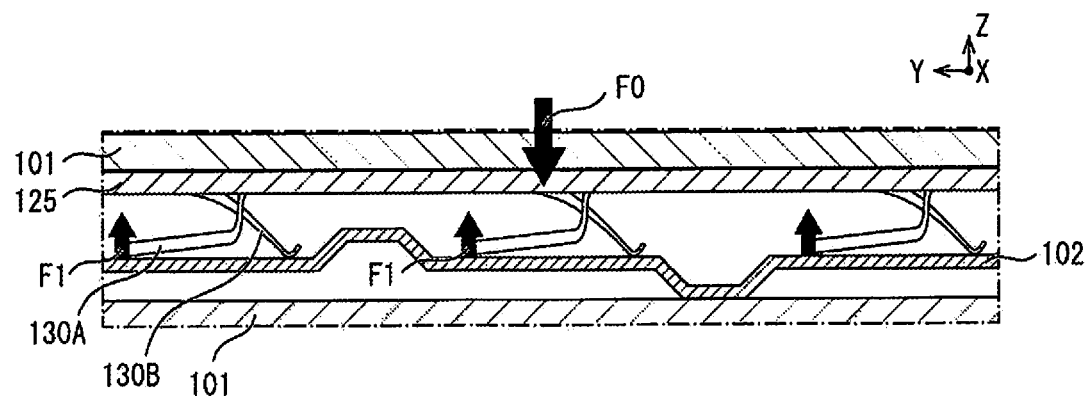
FIG. 21B is a view for explaining the operation of the fuel cell stack according to the embodiment, and is a cross-sectional view schematically illustrating the reaction force that acts on the grid spring at a first temperature.

As shown in FIG. 21B, before the grid spring 120 is heated, when a pressing force F0 is applied to the fuel cell stack 100S in the stacking direction Z, the components to be assembled (the power generation cells 101M, the separator 102, and the like) are supported by a high reaction force F1 generated by the first raised pieces 130A. Thus, it is possible to assemble the components in a state of close mutual contact.

When the grid spring 120 is heated, the first raised pieces 130A undergo creep deformation preferentially over the second raised pieces 130B. As a result, the spring constant k1 of the first raised pieces 130A decreases, as shown in FIG. 22A.

Figure 22A:
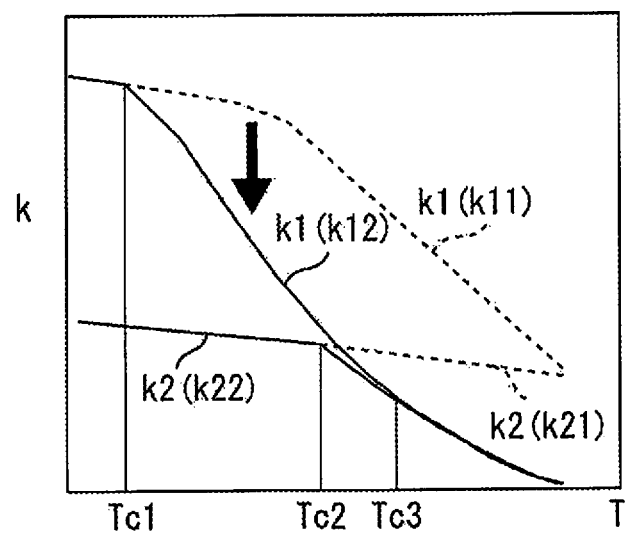
FIG. 22A is a view schematically illustrating changes in the spring constant due to creep deformation of a first spring member and a second spring member according to the embodiment.
Figure 22B:
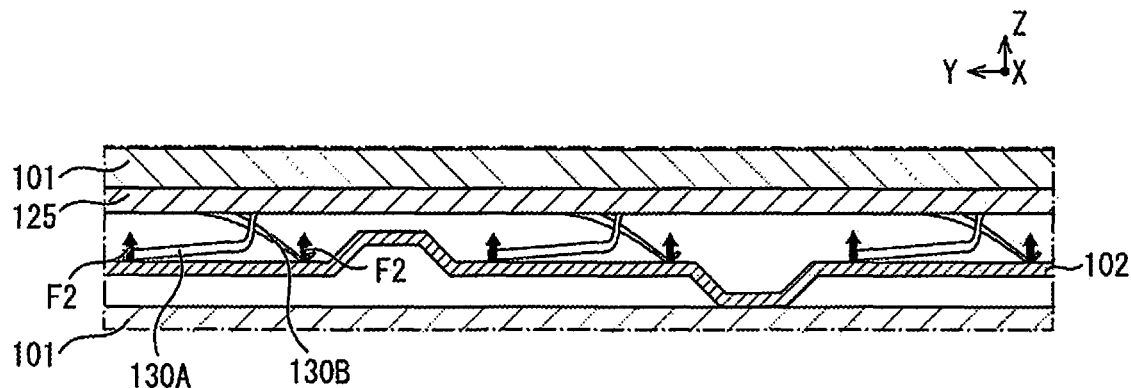
FIG. 22B is a view for explaining the operation of the fuel cell stack according to the embodiment, and is a cross-sectional view schematically illustrating the reaction force that acts on the grid spring at a second temperature.

In FIG. 22A, the spring constant of the first raised pieces 130A and the spring constant of the second raised pieces 130B before creep deformation are respectively indicated by k11 and k21, and the spring constant of the first raised pieces 130A and the spring constant of the second raised pieces 1308 after creep deformation are respectively indicated by k12 and k22.

When the heating temperature exceeds a first threshold Tc1, the first raised pieces 130A undergo creep deformation and the spring constant k1 decreases. When the heating temperature exceeds a second threshold Tc2, the second raised pieces 130B also undergo creep deformation and both the spring constant k1 of the first raised pieces 130A and the spring constant k2 of the second raised pieces 130B decrease. When the heating temperature exceeds the third threshold Tc3, the spring constant k12 of the first raised pieces 130A after creep deformation becomes less than or equal to the spring constant k22 of the second raised pieces 130B. The third threshold Tc3 is about 600° C.

When the spring constant k1 of the first raised pieces 130A decreases, the spring constant K of the entire grid spring 120 decreases. As a result, the force that acts on the grid spring 120 becomes the low reaction force spring F2, and the creep resistance of the grid spring 120 is improved. Therefore, when the fuel cell stack 100S is used, it is possible to stably secure sufficient surface pressure between the anode 101T and the separator 102 as well as between the cathode 101U and the grid spring 120 using the elastic force generated by the grid spring 120.

The action and effects of the above-described embodiment will be described below.

The fuel cell stack 100S is the fuel cell stack 100S made by stacking the plurality of cell units 100T, each having the power generation cell 101M that is formed by sandwiching the electrolyte 101S from both sides with the anode 101T and the cathode 101U and that generates power using supplied gas, and the separator 102 that defines the flow path portions 102L, which are flow passages for the gas between the separator and the power generation cell 101M, and that is in conductive contact with the anode 101T. The fuel cell stack 100S comprises the grid spring 120 provided with the first raised pieces 130A that generate elastic force for pressing the separator 102 toward the power generation cell 101M and the second raised pieces 130B that generate elastic force independently of the first raised pieces 130A. The spring constant k1 of the first raised pieces 130A decreases when the grid spring 120 is heated. Before heating, the spring constant k1 of the first raised pieces 130A is larger than the spring constant k2 of the second raised pieces 130B, so that the grid spring 120 functions as a high reaction force spring. After heating, the grid spring 120 functions as a low reaction force spring since the spring constant k1 of the first raised pieces 130A decreases with applied heat.

According to the fuel cell stack 100S, the cell unit 100T, the grid spring 120, and the method for manufacturing the fuel cell stack 100S, before the grid spring 120 is heated, the spring constant k1 of the first raised pieces 130A is larger than the spring constant k2 of the second raised pieces 130B. As a result, when the cell units 100T is stacked, the components to be assembled (the power generation cells 101M, the separator 102, and the like) can be supported by a high reaction force generated by the first raised pieces 130A, and the components can be assembled in a state of close mutual contact. On the other hand, after the grid spring 120 is heated, the grid spring 120 functions as a low reaction force spring since the spring constant k1 of the first raised pieces 130A decreases with applied heat. Therefore, the creep resistance of the grid spring 120 is improved, and even if the temperature of the grid spring 120 becomes high when the fuel cell stack 100S is used, it is possible to stably secure sufficient surface pressure between the anode 101T and the separator 102 as well as between the cathode 101U and the grid spring 120 using the second raised pieces 130B. Thus, using the fuel cell stack 100S, the cell unit 100T, the grid spring 120, and the method for manufacturing the fuel cell stack 100S, it is possible to prevent a decrease in the power generation performance caused by creep deformation of the grid spring 120.

In particular, since the fuel cell stack 100S according to the present embodiment is a solid oxide fuel cell (SOFC), which uses a solid oxide ceramic as the electrolyte 101S, the operating temperature is extremely high, at approximately 700 to 1000° C. Therefore, compared to a solid polymer membrane fuel cell, the grid spring 120 is relatively easily subjected to creep deformation at the time of operation. With the configuration described above, the fuel cell stack 100S can maintain power generation performance, even for long periods of operation in a high-temperature state.

In addition, using the fuel cell stack 100S, the cell unit LOOT, the grid spring 120, and the method for manufacturing the fuel cell stack 100S, the spring constant k1 of the first spring member 121 is less than or equal to the spring constant k2 of the second spring member 122 before the grid spring 120 is heated.

In addition, using the fuel cell stack 100S, the cell unit 100T, the grid spring 120, and the method for manufacturing the fuel cell stack 100S, the spring constant K of the grid spring 120 can be more reliably reduced following heating. Therefore, it is possible to more reliably improve the creep resistance of the grid spring 120.

In addition, using the fuel cell stack 100S, the cell unit 100T, the grid spring 120, and the method for manufacturing the fuel cell stack 100S, the first raised pieces 130A curve and extend from the substrate 125, and the distal end portions thereof contact the separator 102. Moreover, the second raised pieces 130B curve and extend from the substrate 125, and the distal end portions thereof contact the separator 102. Then, the grid spring 120 generates elastic force as a result of the bending deformation of the first raised pieces 130A and the second raised pieces 130B.

In addition, using the fuel cell stack 100S, the cell unit 100T, the grid spring 120, and the method for manufacturing the fuel cell stack 100S, it is possible to generate elastic force using a simple configuration involving bending deformation. Therefore, according to the fuel cell stack 100S and the method for manufacturing the fuel cell stack 100S, manufacture of the fuel cell stack 100S can be facilitated.

In addition, using the fuel cell stack 100S, the cell unit 100T, the grid spring 120, and the method for manufacturing the fuel cell stack 100S, the bending angle θ1 of the first raised pieces 130A with respect to the substrate 125 is larger than the bending angle θ2 of the second raised pieces 130B with respect to the substrate 125.

In addition, using the fuel cell stack 100S, the cell unit 100T, the grid spring 120, and the method for manufacturing the fuel cell stack 100S, it is possible to adjust the spring constant of the first raised pieces 130A and the spring constant of the second raised pieces 130B using a simple method of varying the bending angle θ1 of the first raised pieces 130A and the bending angle θ2 of the second raised pieces 130B.

In addition, using the fuel cell stack 100S, the cell unit 100T, the grid spring 120, and the method for manufacturing the fuel cell stack 100S, the section modulus of the first raised pieces 130A is larger than the section modulus of the second raised pieces 130B.

In addition, using the fuel cell stack 100S, the cell unit 100T, the grid spring 120, and the method for manufacturing the fuel cell stack 100S, it is possible to adjust the spring constant of the first raised pieces 130A and the spring constant of the second raised pieces 130B using a simple method of varying the section modulus of the first raised pieces 130A and the section modulus of the second raised pieces 130B.

In addition, using the fuel cell stack 100S, the cell unit 100T, the grid spring 120, and the method for manufacturing the fuel cell stack 100S, the width B2 of the second raised pieces 130B decreases from the substrate 125 to the separator 102.

Using the fuel cell stack 100S, the cell unit 100T, the grid spring 120, and the method for manufacturing the fuel cell stack 100S, the bending rigidity of the second raised pieces 130B increases with increasing distance from the side that contacts the separator 102. As a result, the bending stress acts more uniformly on the second raised pieces 130B. Therefore, since the stress that acts on the second raised pieces 130B can be dispersed, creep deformation of the second raised pieces 130B can be more reliably suppressed.

In addition, using the fuel cell stack 100S, the cell unit 100T, the grid spring 120, and the method for manufacturing the fuel cell stack 100S, the plate thickness H2 of the second raised pieces 130B decreases from the substrate 125 to the separator 102.

In addition, using the fuel cell stack 100S, the cell unit 100T, the grid spring 120, and the method for manufacturing the fuel cell stack 100S, the bending rigidity of the second raised pieces 130B increases with increasing distance from the side that contacts the separator 102. As a result, the bending stress acts more uniformly on the second raised pieces 130B. Therefore, since the stress that acts on the second raised pieces 130B can be dispersed, the creep deformation of the second raised pieces 130B can be more reliably suppressed.

In addition, using the fuel cell stack 100S, the cell unit 100T, the grid spring 120, and the method for manufacturing the fuel cell stack 100S, the grid spring 120 is configured by arranging the first raised pieces 130A and the second raised pieces 130B along the planar direction of the separator 102. The first raised pieces 130A are arranged at the corners and the center of the grid spring 120.

Using the fuel cell stack 100S, the cell unit 100T, the grid spring 120, and the method for manufacturing the fuel cell stack 100S, the separator 102 can be uniformly pressed in the planar direction toward the anode 101T using the larger spring constant of the first raised pieces 130A relative to the second raised pieces 130B at the first temperature T1.

Therefore, the accuracy of assembly of the components during stacking of the cell units 100T is improved.

In addition, using the method for manufacturing the fuel cell stack 100S, when the power generation cells 101M are stacked, one of the power generation cells 101M and the separator 102 are brought relatively close to each other, to thereby apply a force to the first raised pieces 130A in the stacking direction Z and cause the first raised pieces 130A to yield.

Using the method for manufacturing the fuel cell stack 100S, the first raised pieces 130A are subjected to plastic deformation by causing the first raised pieces 130A to yield. It is thereby possible to promote creep deformation of the first raised pieces 130A when the grid spring 120 is heated. Therefore, it is possible to more reliably decrease the spring constant K of the entire grid spring 120 as the spring constant k1 of the first raised pieces 130A decreases. As a result, it is possible to more reliably improve the creep resistance of the grid spring 120.

First Modified Example

In the embodiment described above, both the first raised pieces 130A and the second raised pieces 130B are configured in the form of cantilever beams in order to generate bending deformation. However, the form of the raised pieces 130 is not particularly limited so long as bending deformation can occur.

Figure 23A:
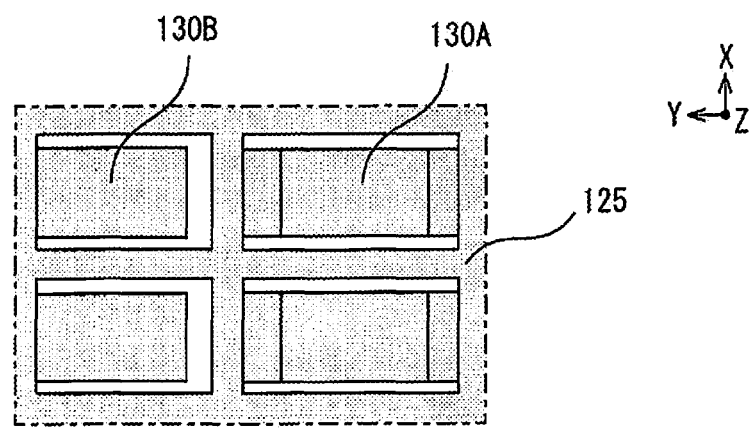
FIG. 23A is a plan view illustrating a part of the grid spring according to a first modified example.
Figure 23B:
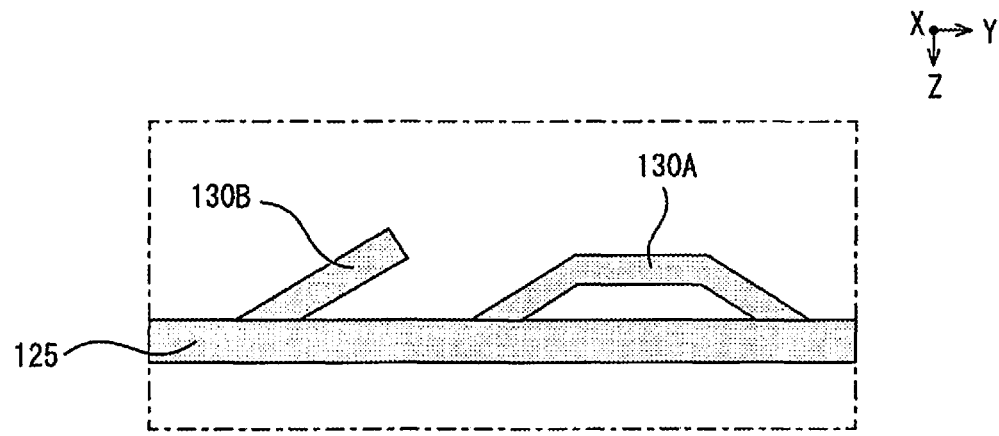
FIG. 23B is a schematic side view illustrating a part of the grid spring according to the first modified example.

As shown in FIGS. 23A and 23B, the first raised pieces 130A may be in the form of a hoop spring.

Using the fuel cell stack 100S, the cell unit 100T, and the grid spring 120 of the present modified example, the first spring constant k1 of the first raised pieces 130A can easily be made larger than the spring constant of the second raised pieces 130B using a simple configuration in which the first raised pieces 130A are hoop springs.

Second Modified Example

Figure 24A:
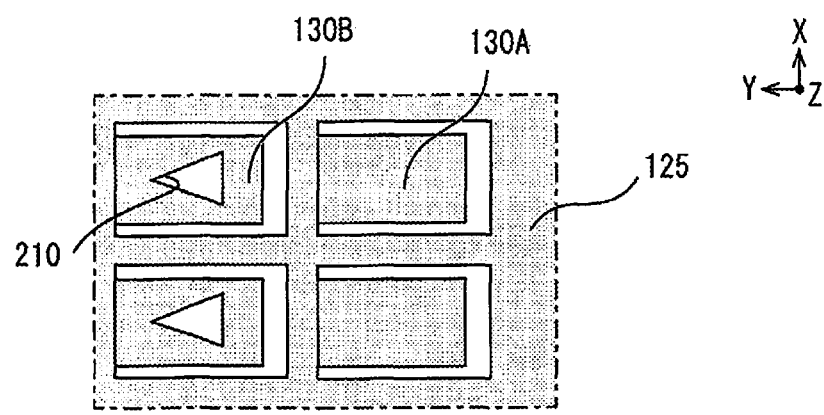
FIG. 24A is a plan view illustrating a part of the grid spring according to a second modified example.
Figure 24B:
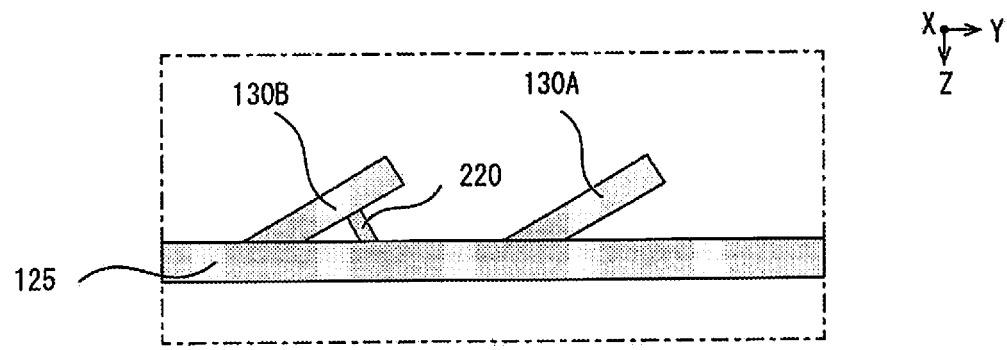
FIG. 24B is a schematic side view illustrating a part of the grid spring according to the second modified example.

In addition, the second raised pieces 130B may be equal moment beams, as shown in FIGS. 24A and 24B. An equal moment beam means that the sectional secondary moment is constant in the direction in which the second raised pieces 130B extend.

The second raised pieces 130B have openings 210 for adjusting the moment. The width of the opening 210 increases from the substrate 125 to the distal end of the second raised pieces 130B. The opening 210 has a triangular shape.

The second spring member 122 may also include a restricting portion 220 that restricts the displacement of the second raised piece 130B in the stacking direction Z.

The restricting portion 220 extends from the second raised piece 130B toward the substrate 125 side. The restricting portion 220 has a form in which part of the second raised piece 130B is notched and raised. The opening 210 for adjusting the moment can be formed together with the restricting portion 220.

According to the fuel cell stack 100S, the cell unit 100T, and the grid spring 120 of the present modified example, the second raised pieces 130B are equal moment beams. As a result, the bending stress acts more uniformly on the second raised pieces 130B. Therefore, since the stress that acts on the second raised pieces 130B can be dispersed, the creep deformation of the second raised pieces 130B can be more reliably suppressed.

In addition, using the fuel cell stack 100S, the cell unit 100T, and the grid spring 120 of the present modified example, the second raised pieces 130B have restricting portions 220 that restrict the displacement of the second raised pieces 130B in the stacking direction Z. As a result, the fuel cell stack 100S can prevent excessive bending deformation of the second raised pieces 130B. Therefore, it is possible to apply surface pressure more reliably between the cathode 101U and the substrate 125 as well as between the anode 101T and the separator 102.

Third Modified Example

In the embodiment described above, the grid spring 120 is configured by arranging the first raised pieces 130A and the second raised pieces 130B on one substrate 125. However, as shown in FIGS. 25A, 25B, 25C, and 25D, the grid spring 120 may be configured by arranging the first raised pieces 130A and the second raised pieces 130B on different substrates 125.

Figure 25A:
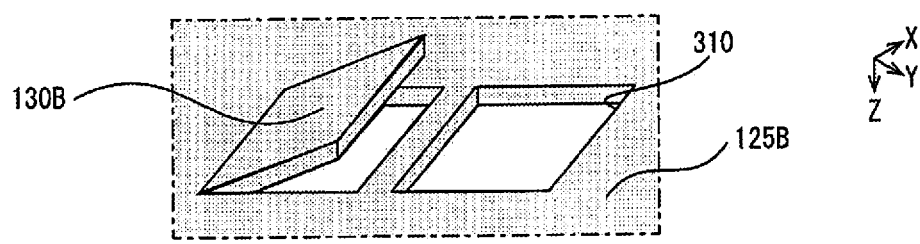
FIG. 25A is a schematic perspective view illustrating a part of a second grid spring according to a third modified example.
Figure 25B:
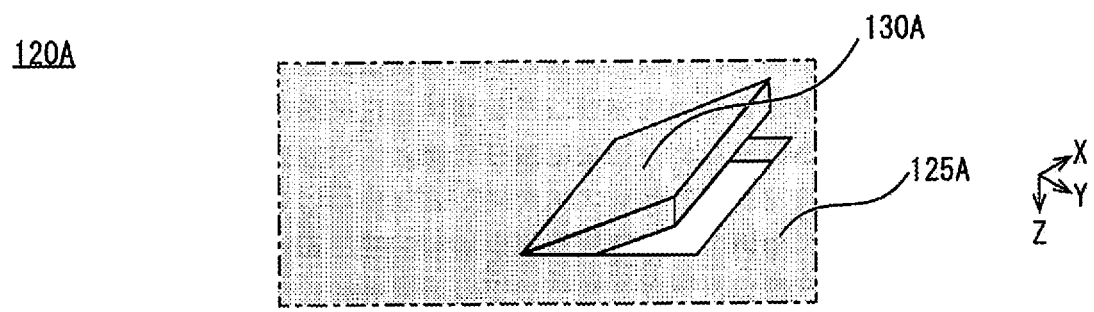
FIG. 25B is a schematic perspective view illustrating a part of a first grid spring according to the third modified example.
Figure 25C:
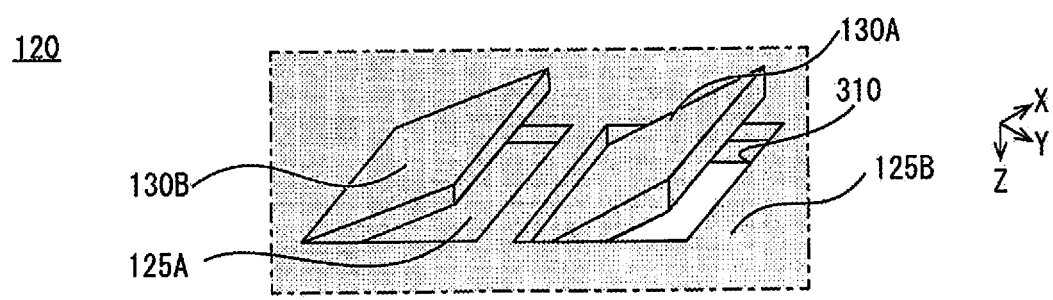
FIG. 25C is a schematic perspective view illustrating a part of a grid spring in a state in which the first grid spring and the second grid spring according to the third modified example are stacked.
Figure 25D:
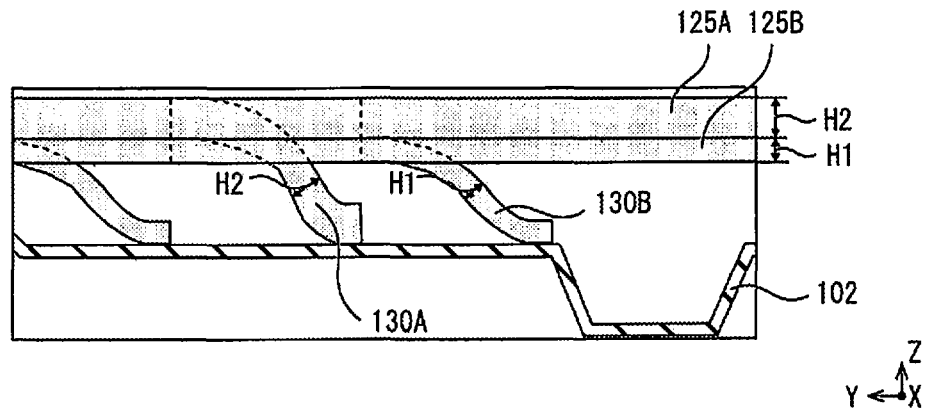
FIG. 25D is a schematic cross-sectional view of the grid spring according to the third modified example.

The grid spring 120 includes the first grid spring 120A (refer to FIG. 25B) and the second grid spring 120B that generates elastic force independently of the first grid spring 120A (refer to FIG. 25A). The grid spring 120 is configured by stacking the second grid spring 120B on the first grid spring 120A (refer to FIG. 25C).

The first grid spring 120A includes a flat first substrate 125A (corresponding to the first base portion) and a plurality of elastically deformable first raised pieces 130A (corresponding to the first spring portion) raised so as to be cantilevered from the first substrate 125A.

The second grid spring 120B includes a flat second substrate 125B (corresponding to the second base portion) and a plurality of elastically deformable second raised pieces 130B (corresponding to the second spring portion) raised so as to be cantilevered from the second grid spring 125B.

The plate thickness H2 of the second raised pieces 130B is thinner than the plate thickness H1 of the first raised pieces 130A.

The plate thickness H1 of the first raised pieces 130A and the plate thickness of the first substrate 125A are the same. The plate thickness H2 of the second raised pieces 125B and the plate thickness of the second raised pieces 130B are the same.

The second substrate 125B has an opening 310 for housing the first raised pieces 130A. The opening 310 houses the first raised pieces 130A in a state in which the second grid spring 120B is stacked on the first grid spring 120A (refer to FIG. 25C).

Using the fuel cell stack 100S, the cell unit 100T, and the grid spring 120 of the present modified example, the grid spring 120 is formed by stacking the second grid spring 120B on the first grid spring 120A. Thus, since the first grid spring 120A and the second grid spring 120B can be formed in independent steps, the manufacture of the first grid spring 120A and the second grid spring 120B, which have different spring constants, can be facilitated.

Using the fuel cell stack 100S, the cell unit 100T, and the grid spring 120 of the present modified example, the plate thickness H2 of the second raised pieces 130B is thinner than the plate thickness H1 of the first raised pieces 130A. Thus, when the cell units 100T are stacked, the anode 101T and the separator 102 can be pressed since the first raised pieces 130A have a larger plate thickness than the second raised pieces 130B. At this time, since the stress acting on the first raised pieces 130A is greater than that acting on the second raised pieces 130B, it is possible to preferentially cause the first raised pieces 130A to undergo creep deformation when the grid spring 120 is heated. As a result, the overall spring constant K of the grid spring 120 can be more reliably reduced as the spring constant k1 of the first raised pieces 130A decreases. Therefore, the creep resistance of the grid spring 120 can be more reliably improved.

Fourth Modified Example

Figure 26A:
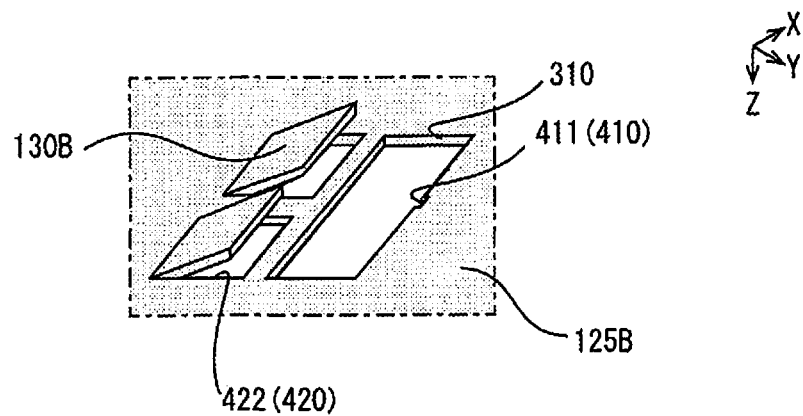
FIG. 26A is a schematic perspective view illustrating a part of the second grid spring according to a fourth modified example.
Figure 26B:
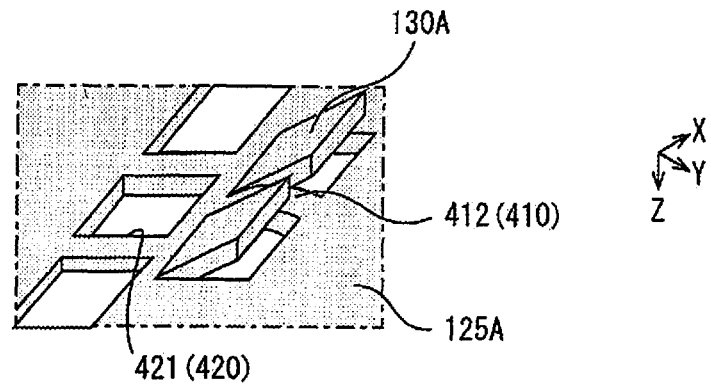
FIG. 26B is a schematic perspective view illustrating a part of the first grid spring according to the fourth modified example.
Figure 26C:
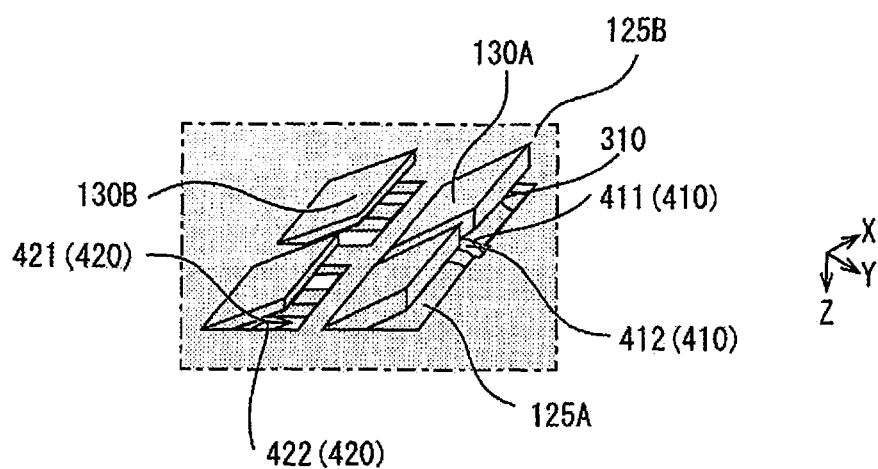
FIG. 26C is a schematic perspective view illustrating a part of the grid spring in a state in which the first grid spring and the second grid spring according to the fourth modified example are stacked.

In the embodiment described above in the Third Modified Example, the grid spring 120 may further include a positioning mechanism 410 for carrying out positioning between the first raised pieces 130A and the second raised pieces 130B, and a circulation portion 420 for circulating gas from one side to the other side of the first grid spring 120A and the second grid spring 120B in the stacking direction Z, as shown in FIGS. 26A, 26B, and 26C.

The second grid spring 120B has an opening 310 for housing the first raised pieces 130A. The positioning mechanism 410 has a concave portion 411 at the edges that configure the opening 310 and a convex portion 412 that fits the concave portion 411 on the first substrate 125A.

The circulation portion 420 has a first opening 421 opened in the plate thickness direction of the first substrate 125A, and a second opening 422 opened in the plate thickness direction of the second substrate 125B. The first opening 421 and the second opening 422 communicate with each other in a state in which the first grid spring 120A and the second grid spring 120B are stacked. The first opening 421 and the second opening 422 are offset in the transverse direction X (refer to FIG. 26C), when the grid spring 120 is seen in a plan view in a state in which the first grid spring 120A and the second grid spring 120B are stacked.

The first raised pieces 130A and the second raised pieces 130B are arranged along the transverse direction X. The concave portion 411 is formed near the center of the edge portion along the transverse direction X configuring the opening 310. The convex portion 412 is arranged between one first raised piece 130A and another first raised piece 130A. The convex portion 412 has a form in which a portion of the first substrate 125A sandwiched between the one first raised piece 130A and the other first raised piece 130A is curved toward the side in which the second grid spring 120B is disposed when the second grid spring 120B is stacked on the first grid spring 120A.

The first opening 421 is disposed on the first substrate 125A at a position different from that of the first raised piece 130A.

The second raised piece 130B has a form in which a part of the second substrate 125B is notched and raised. The second opening 422 is formed together with the formation of the second raised piece 130B.

Using the fuel cell stack 100S, the cell unit 100T, and the grid spring 120 of the present modified example, the grid spring 120 has the positioning mechanism 410 for carrying out positioning between the first raised pieces 130A and the second raised pieces 130B. It is thereby possible to easily carry out positioning between the first raised pieces 130A and the second raised pieces 130B when the first grid spring 120A and the second grid spring 120B are stacked. Therefore, using the fuel cell stack 100S, the manufacture of the grid spring 120 can be facilitated.

In addition, the fuel cell stack 100S, the cell unit 100T, and the grid spring 120 of the present modified example are provided with the circulation portion 420 for circulating gas from one side to the other side of the first grid spring 120A and the second grid spring 120B in the stacking direction Z.

As a result, it is possible to circulate gas from one side to the other side of the first grid spring 120A and the second grid spring 120B in the stacking direction. Therefore, since the amount of gas that is supplied to the power generation cells 101M is increased, the electrical power generated by the power generation cells 101M can also be increased.

Fifth Modified Example

In the Third and Fourth Modified Examples described above, the first raised pieces 130A and the second raised pieces 130B are arranged at different positions of the grid spring 120 in plan view, in a state in which the second grid spring 120B is stacked on the first grid spring 120A However, as shown in FIGS. 27A, 27B, 27C, and 27D, the first raised pieces 130A and the second raised pieces 130B may be arranged in superimposed fashion in the stacking direction Z.

Figure 27A:
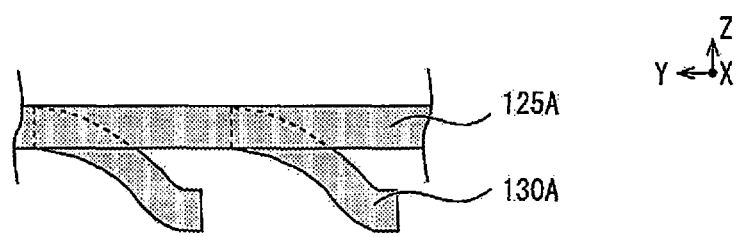
FIG. 27A is a schematic side view illustrating a part of the first grid spring according to a fifth modified example.
Figure 27B:
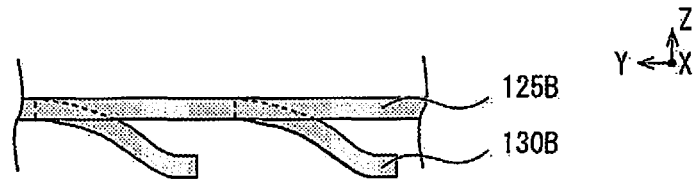
FIG. 27B is a schematic side view illustrating a part of the second grid spring according to the fifth modified example.
Figure 27C:
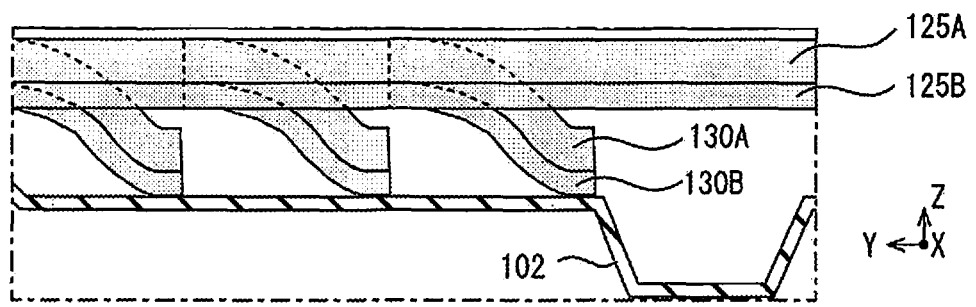
FIG. 27C is a schematic cross-sectional view illustrating a part of the grid spring in a state in which the first grid spring and the second grid spring according to the fifth modified example are stacked, and is a view in which the grid spring is at the first temperature.
Figure 27D:
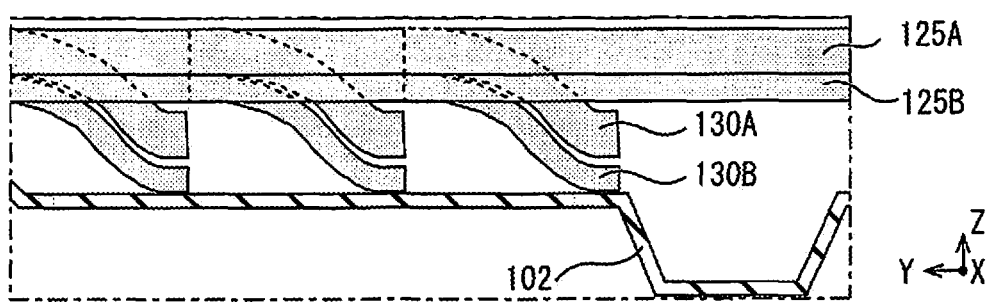
FIG. 27D is a schematic cross-sectional view illustrating a part of the grid spring in a state in which the first grid spring and the second grid spring according to the fifth modified example are stacked, and is a view in which the grid spring is at the second temperature.

As shown in FIG. 27C, the first raised pieces 130A press against the separator 102 at the first temperature T1. As shown in FIG. 27D, the first raised pieces 130A restrict the deformation of the second raised pieces 130B in the stacking direction Z at the second temperature T2.

Using the fuel cell stack 100S, the cell unit 100T, and the grid spring 120 of the present modified example, the first raised pieces 130A can prevent the excessive deformation of the second raised pieces 130B in the stacking direction Z at the second temperature T2. As a result, it is possible to more reliably apply surface pressure between the cathode 101U and the substrate 125 as well as between the anode 101T and the separator 102.

Sixth Modified Example

Figure 28:
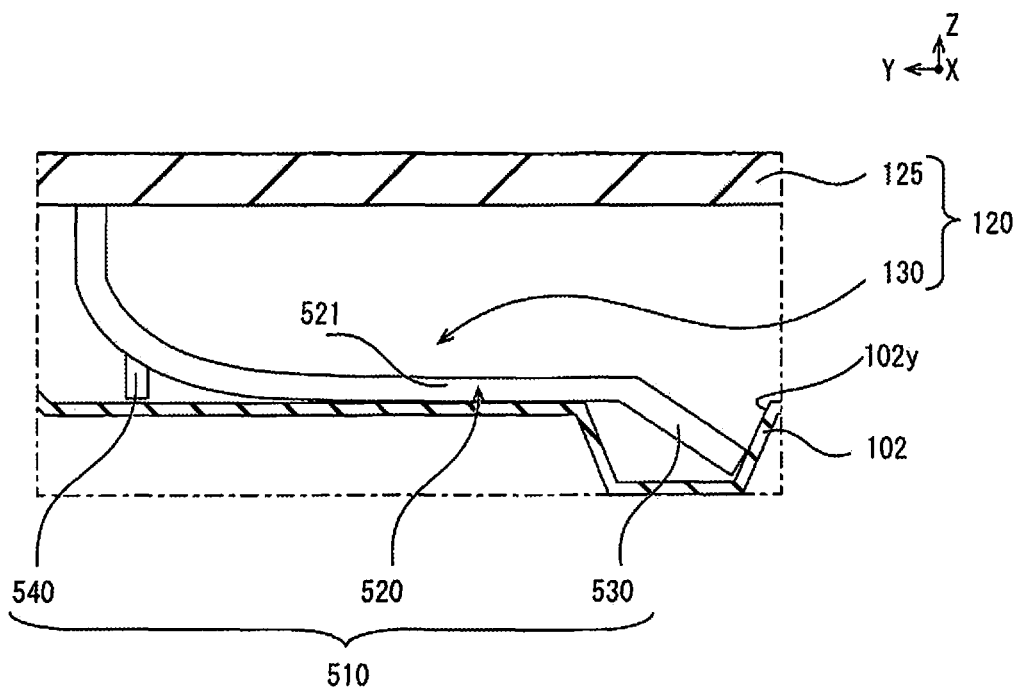
FIG. 28 is a schematic cross-sectional view of the grid spring according to a sixth modified example.

As shown in FIG. 28, the raised pieces 130 can have a positioning mechanism 510 for positioning the raised pieces 130.

The positioning mechanism 510 includes a joint positioning portion 520 for joining the raised piece 130 to the separator 102, a planar direction positioning portion 530 for carrying out positioning of the separator 102 in the planar direction, and a stacking direction positioning portion 540 for carrying out positioning in the stacking direction Z.

The joint positioning portion 520 has a planar portion 521 that comes into surface contact with the separator 102. In the planar portion 521, the raised piece 130 is welded and joined to the separator 102.

The planar direction positioning portion 530 abuts a concave portion 102y of the separator 102 to thereby position the raised piece 130 in the planar direction of the separator 102. The planar direction positioning portion 530 extends from the planar portion 521 toward the concave portion 102y of the separator 102. The distal end of the planar direction positioning portion 530 is bent toward the recessed side of the concave portion 102y.

The stacking direction positioning portion 540 extends from the raised piece 130 toward the separator 102 in the stacking direction Z. When the raised piece 130 is displaced, the stacking direction positioning portion 540 abuts the separator 102 to thereby restrict the displacement of the raised piece 130 in the stacking direction Z. It is thus possible to prevent the excessive deformation of the raised pieces 130 in the stacking direction Z.

By means of the fuel cell stack 100S, the cell unit 100T, and the grid spring 120 of the modified example, the grid spring 120 has the positioning mechanism 510 for carrying out positioning of the raised pieces 130. As a result, when the grid spring 120 is disposed between the power generation cell 101M and the separator 102, the grid spring 120 can be easily positioned. Therefore, by means of the fuel cell stack 100S, the manufacture of the fuel cell stack 100S can be facilitated.

Seventh Modified Example

Figure 29A:
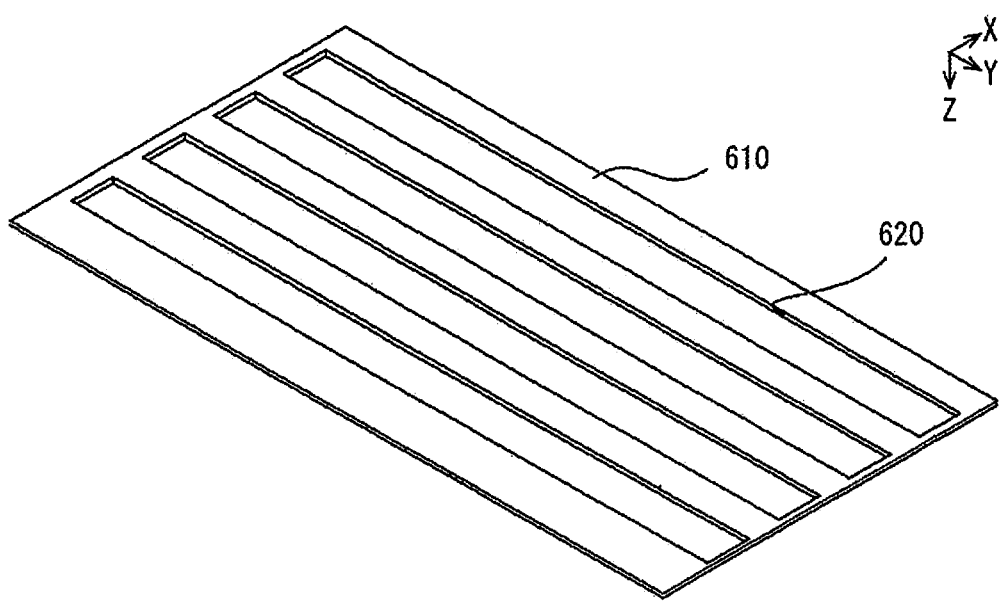
FIG. 29A is a perspective view of the first grid spring according to a seventh modified example.
Figure 29B:
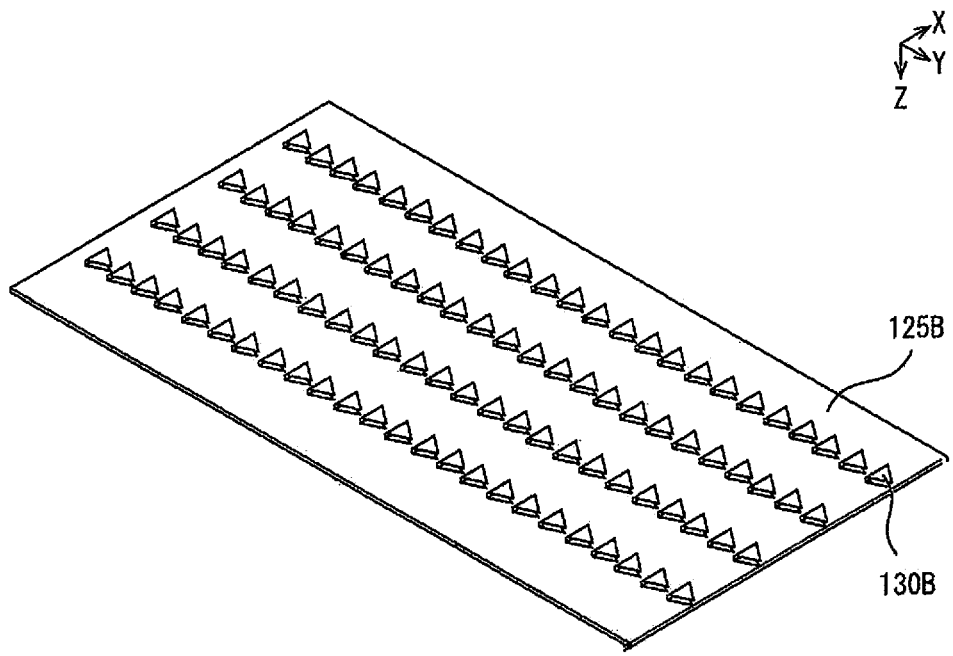
FIG. 29B is a perspective view of the second grid spring according to the seventh modified example.

As shown in FIGS. 29A and 29B, the grid spring 120 may include the first grid spring 120A that disappears when the grid spring 120 is heated, and the second grid spring 120B that generates elastic force independently of the first grid spring 120A.

The first grid spring 120A is made of a material that disappears when the grid spring 120 is heated from the first temperature T1 to the second temperature T2. The first grid spring 120A can be made of carbon paper, for example.

The second grid spring 120B has the second raised pieces 130B. The configuration of the second raised pieces 130B is the same as that of the embodiments described above.

Figure 29C:
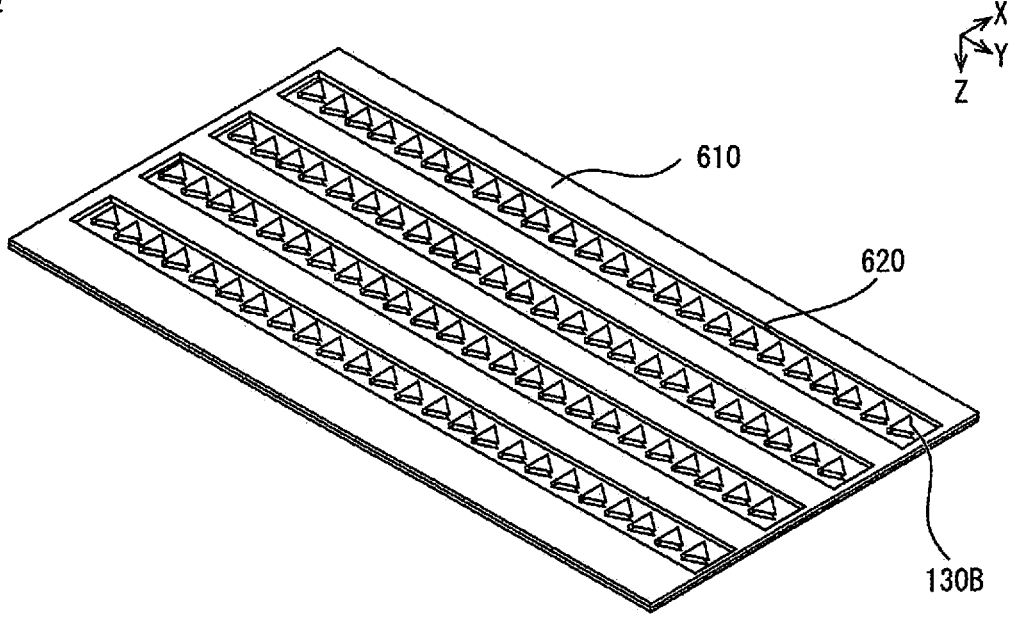
FIG. 29C is a perspective view of the grid spring in a state in which the first grid spring and the second grid spring according to the seventh modified example are stacked.

As shown in FIG. 29C, the first grid spring 120A has a frame body 610 (corresponding to the first spring portion) and an opening 620 that houses the second raised pieces 130B of the second grid spring 120B when the second raised pieces are stacked on the second grid spring 120B.

Figure 29D:
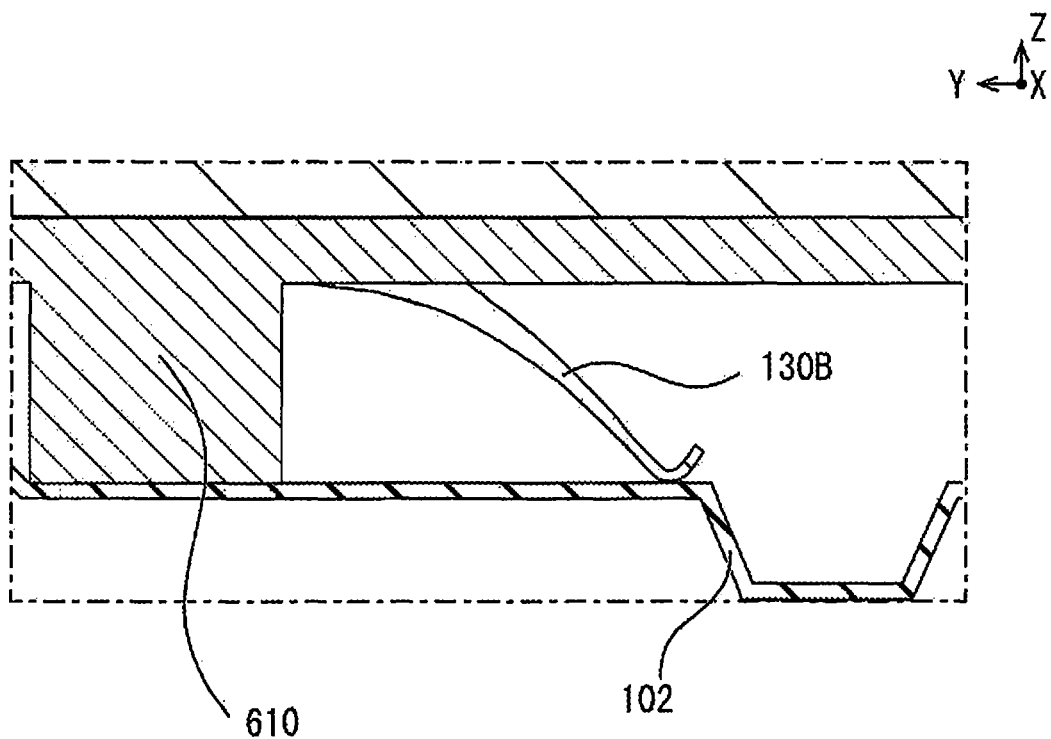
FIG. 29D is a schematic cross-sectional view illustrating a part of the grid spring in a state in which the first grid spring and the second grid spring according to the seventh modified example are stacked.

As shown in FIG. 29D, the first grid spring 120A presses against the separator 102 with the frame body 610 before the grid spring 120 is heated.

By means of the present modified example, it is possible to prevent a decrease in the power generation performance of the fuel cell stack 100S caused by creep deformation of the grid spring 120, in the same manner as in the embodiments described above.

In addition, by means of the cell unit 100T, the grid spring 120, and the method for manufacturing the fuel cell stack 100S of the present modified example, since the first grid spring 120A disappears when the grid spring 120 is heated, the spring constant K of the entire grid spring 120 can be more reliably reduced. Therefore, it is possible to more reliably improve the creep resistance of the grid spring 120.

Other than the foregoing, various modifications to the present invention based on the configurations described in the Claims are possible, which also belong to the scope of the present invention.

For example, the first temperature, the second temperature, the third temperature, and the heating time are not limited to the values described above in the description of the embodiments.

In addition, the heating of the grid spring is not limited to heating by means of trial operation before shipment as described above; the grid spring may be heated together with the firing of a sealing material used for the fuel cell stack, or the like.

The plate thickness of the grid spring in the first embodiment gradually decreases toward the distal end in order to facilitate bending, but it goes without saying that the plate thickness may be made constant, as in the other embodiments.

The invention claimed is:

1. A spring member used for a fuel cell stack in which are stacked a plurality of fuel cell units, each of the fuel cell units having a power generation cell that is formed by sandwiching an electrolyte from both sides with a pair of electrodes and that generates power using supplied gas, and a separator that defines a flow path portion, which is a flow passage for the gas between the separator and the power generation cell, and that is in conductive contact with the power generation cell, the spring member comprising:
- a first spring member that generates a first elastic force for pressing the separator toward the power generation cell; and
- a second spring member that generates a second elastic force for pressing the separator toward the power generation cell independently of the first spring member,
- the first spring member having a spring constant that decreases upon the spring member being heated,
- the spring constant of the first spring member being larger than a spring constant of the second spring member before being heated, and
- the first spring member and the second spring member each comprising a plurality of elastically deformable raised pieces that are raised so as to be cantilevered from a same substrate.

2. The spring member according to claim 1, wherein the spring constant of the first spring member is less than or equal to the spring constant of the second spring member after being heated.

3. The spring member according to claim 1, wherein the first spring member includes a first base portion spaced apart from the separator, and a first spring portion extending from the first base portion toward the separator while being curved and having a distal end contacting the separator,
the second spring member includes a second base portion spaced apart from the separator, and a second spring portion extending from the second base portion toward the separator while being curved and having a distal end contacting the separator, and
the first spring member generates the first elastic force as a result of a bending deformation of the first spring portion, and the second spring member generates the second elastic force as a result of a bending deformation of the second spring portion.

4. The spring member according to claim 3, wherein a bending angle of the first spring portion with respect to the first base portion is larger than a bending angle of the second spring portion with respect to the second base portion.

5. The spring member according to claim 3, wherein a section modulus of the first spring portion is larger than a section modulus of the second spring portion.

6. The spring member according to claim 3, wherein a width of the second spring portion decreases from the second base portion to the separator.

7. The spring member according to 6 claim 3, wherein a plate thickness of the second spring portion decreases from the second base portion to the separator.

8. The spring member according to claim 3, wherein the spring member is formed by stacking the second spring member on the first spring member.

9. The spring member according to claim 8, wherein a plate thickness of the second spring member is thinner than a plate thickness of the first spring member, and the second base portion has an opening for housing the first spring portion.

10. The spring member according to claim 9, wherein the spring member has a positioning member for positioning between the first spring member and the second spring member, and a circulation portion for circulating the gas from one side to the other side of the first spring member and the second spring member in a stacking direction.

11. The spring member according to claim 8, wherein the first spring portion and the second spring portion are arranged at different positions in the stacking direction of the fuel cell unit, in a state in which the second spring member is stacked on the first spring member.

12. The spring member according to claim 3, wherein the first spring portion is a hoop spring.

13. The spring according to claim 3, wherein the second spring member has a restricting portion that restricts displacement of the second spring portion in a stacking direction of the fuel cell unit, and the second spring portion is an equal moment beam.

14. A fuel cell unit comprising the spring member according to claim 3, and further comprising
a power generation cell that is formed by sandwiching an electrolyte from both sides with a pair of electrodes and that generates power using supplied gas, a separator that defines a flow path portion, which is a flow passage for the gas between the separator and the power generation cell, and that is in conductive contact with the power generation cell.

15. The fuel cell unit according to claim 14, wherein the spring member has a positioning member for positioning of the spring member with respect to the separator.

16. The fuel cell unit according to claim 14 or 15, wherein the spring member is formed by arranging the first spring member and the second spring member along a planar direction of the separator, and
the first spring member is arranged at least at a corner portion and a center portion of the spring member.

17. A fuel cell stack in which are stacked a plurality of the fuel cell units according to claim 14.

18. A method for manufacturing a fuel cell stack in which are stacked a plurality of fuel cell units, each of the fuel cell units having a power generation cell that is formed by sandwiching an electrolyte from both sides with a pair of electrodes and that generates power using supplied gas, and a separator that defines a flow path portion, which is a flow passage for the gas between the separator and the power generation cell, and that is in conductive contact with the power generation cell, the method comprising
disposing a spring member including a first spring member that generates a first elastic force for pressing the separator toward the power generation cell, and a second spring member that generates a second elastic force for pressing the separator toward the power generation cell independently of the first spring member, when the fuel cell units are stacked,
when the spring member is disposed, the first spring member has a higher spring constant relative to a spring constant of the second spring member, and
stacking the fuel cell units and then heating the spring member such that the spring constant of the first spring member decreases,
the first spring member and the second spring member each comprising a plurality of elastically deformable raised pieces that are raised so as to be cantilevered from a same substrate.

19. The method for manufacturing a fuel cell stack according to claim 18, wherein
one of the power generation cells and the separator are brought relatively closer together, when the fuel cell units are stacked, thereby applying a force to the first spring member in a stacking direction of the fuel cell units and to cause the first spring member to yield.

* * * * *